(12) United States Patent
Agliata et al.

(10) Patent No.: US 11,264,664 B2
(45) Date of Patent: *Mar. 1, 2022

(54) RECLOSER BATTERY ASSEMBLY

(71) Applicant: Hubbell Incorporated, Shelton, CT (US)

(72) Inventors: Peter M. Agliata, Birmingham, AL (US); Nathaniel Ginzton, Leeds, AL (US)

(73) Assignee: Hubbell Incorporated, Shelton, CT (US)

( * ) Notice: Subject to any disclaimer, the term of this patent is extended or adjusted under 35 U.S.C. 154(b) by 141 days.

This patent is subject to a terminal disclaimer.

(21) Appl. No.: 16/506,554

(22) Filed: Jul. 9, 2019

(65) Prior Publication Data
US 2019/0334132 A1    Oct. 31, 2019

Related U.S. Application Data

(63) Continuation of application No. 16/451,929, filed on Jun. 25, 2019, now abandoned, which is a continuation of application No. 15/584,917, filed on May 2, 2017, now Pat. No. 10,333,112, application No. 16/506,554, filed on Jul. 9, 2019, which is a continuation of application No. 15/584,928, filed on May 2, 2017, now Pat. No. 10,347,879, application No. 16/506,554, filed on Jul. 9, 2019, which is a continuation of application No. 15/584,932, filed on May 2, 2017, now Pat. No. 10,355,253.

(60) Provisional application No. 62/330,355, filed on May 2, 2016.

(51) Int. Cl.
| | |
|---|---|
| *H01M 2/04* | (2006.01) |
| *H01M 2/34* | (2006.01) |
| *H01H 31/00* | (2006.01) |
| *H01H 75/04* | (2006.01) |
| *H02H 7/26* | (2006.01) |
| *H02J 7/00* | (2006.01) |
| *H02J 7/24* | (2006.01) |
| *H01M 50/147* | (2021.01) |
| *H01M 50/572* | (2021.01) |
| *H01M 50/20* | (2021.01) |
| *H01M 50/107* | (2021.01) |
| *H01R 4/22* | (2006.01) |
| *H01R 11/14* | (2006.01) |
| *F16B 31/02* | (2006.01) |

(52) U.S. Cl.
CPC ........ *H01M 50/147* (2021.01); *H01H 31/006* (2013.01); *H01H 75/04* (2013.01); *H01M 50/572* (2021.01); *H02H 7/26* (2013.01); *H02J 7/0026* (2013.01); *H02J 7/24* (2013.01); *F16B 31/027* (2013.01); *H01M 50/107* (2021.01); *H01M 50/20* (2021.01); *H01M 2200/00* (2013.01); *H01M 2200/20* (2013.01); *H01R 4/22* (2013.01); *H01R 11/14* (2013.01)

(58) Field of Classification Search
CPC ............ H01M 50/147; H01M 50/572; H01M 2200/20; H01M 2200/00; H01M 50/20; H01M 50/107; H02J 7/24; H02J 7/0026; H01H 31/006; H01H 75/04; H02H 7/26; H01R 4/22; H01R 11/14; F16B 31/027; Y02E 60/10

See application file for complete search history.

(56) References Cited

U.S. PATENT DOCUMENTS

| | | | | |
|---|---|---|---|---|
| 2,542,132 | A * | 2/1951 | Goertzen | H01H 35/02 200/61.51 |
| 4,581,504 | A * | 4/1986 | Hamel, Sr. | H01H 35/146 200/61.08 |
| 4,956,755 | A * | 9/1990 | Maglica | F21L 4/005 362/206 |
| 5,110,003 | A | 5/1992 | MacWilliams | |
| 5,378,549 | A * | 1/1995 | Eylon | H01M 50/50 429/1 |
| 6,794,596 | B2 | 9/2004 | Rhein et al. | |
| 2002/0179571 | A1* | 12/2002 | Rhein | H01H 33/6662 218/7 |

(Continued)

FOREIGN PATENT DOCUMENTS

| | | |
|---|---|---|
| CN | 103748727 | 4/2014 |
| CN | 203873003 | 10/2014 |

OTHER PUBLICATIONS

Versa-Tech Single-Phase Recloser for Distribution Systems, Hubbell. Maintenance Manual. Mar. 30, 2015 <URL: http://www.hubbellpowersystems.com/resources/instructions/chance-construction/pdf/PSP862-0311.pdf> (41 pages).

(Continued)

*Primary Examiner* — Muhammad S Siddiquee
(74) *Attorney, Agent, or Firm* — Michael Best & Friedrich LLP

(57) ABSTRACT

A circuit interrupting device for use with a electrical power distribution system includes a housing containing a circuit interrupting mechanism. A battery tube is positioned in the housing. A battery assembly is configured to be inserted into the battery tube. The battery assembly includes a battery assembly body having a first end and a second end. A battery is positioned in the battery assembly body. The battery assembly is configured such that both a positive contact and a negative contact are exposed from the second end of the battery assembly body. In some embodiments, the battery assembly includes a keyed portion mates with the battery tube to ensure alignment of the battery assembly in the battery tube.

20 Claims, 25 Drawing Sheets

(56) References Cited

U.S. PATENT DOCUMENTS

2004/0008510 A1* 1/2004 Mah .................. H02J 7/025
  362/192
2004/0144757 A1* 7/2004 Rhein ............... H01H 33/6662
  218/120
2009/0016050 A1 1/2009 Opolka
2010/0177507 A1* 7/2010 West .................. H01M 50/213
  362/183

OTHER PUBLICATIONS

PCT/US2017/030637 International Search Report and Written Opinion dated Sep. 18, 2017 (14 pages).
PCT/US2017/030635 International Search Report and Written Opinion dated Sep. 18, 2017 (12 pages).
PCT/US2017/030640 International Search Report and Written Opinion dated Sep. 22, 2017 (12 pages).
CN201780029891.5 First Office Action Issued by the China National Intellectual Property Administration dated May 28, 2019 and translation (24 pages).

* cited by examiner

RECLOSER BATTERY ASSEMBLY

RELATED APPLICATION(S)

This application is a continuation of: U.S. patent application Ser. No. 16/451,929 filed Jun. 25, 2019 (which is a continuation of U.S. patent application Ser. No. 15/584,917, filed May 2, 2017); U.S. patent application Ser. No. 15/584,928, filed May 2, 2017; and U.S. patent application Ser. No. 15/584,932, filed May 2, 2017, all of which claim priority to U.S. provisional application Ser. No. 62/330,355, filed May 2, 2016. The disclosures of all of the preceding are incorporated herein by reference in their entirety and to which priority is claimed.

FIELD

Various exemplary embodiments relate to a battery assembly for a utility line circuit interrupter such as a recloser.

BACKGROUND

Conventional circuit interrupting devices, such as circuit breakers, and reclosers, provide protection for power distribution systems and the various apparatus on those power distribution systems by isolating a faulted section from the upstream power source in the system. Fault current, or momentary current surges, in the system can occur under various conditions, including lightning, an animal or tree contacting the power lines, or adjacent power lines contacting each other. For example, windy conditions often cause power lines strung between poles to swing, thereby momentarily touching each other or a grounded conductor. These types of transitory events cause momentary power line short circuits that in turn cause fuses to burn out or circuit breaker to trip.

Most of the faults occurring on a line are transient faults, as opposed to permanent faults, and do not require permanent protection. Therefore, reclosers are a common solution for clearing these types of transient faults without causing a permanent power outage. Reclosers are typically mounted to support structures in electrical power distribution systems to provide continuous electrical service up to a programmed current threshold. Reclosers detect faults, i.e., overcurrent events past the programmed threshold, and interrupt the load current when the overcurrent event persists for a predetermined amount of time which is determined by the overcurrent value. If the recloser operates and temporarily interrupts the load current, it will automatically restore service after the transient fault condition is gone. If a fault is permanent, the recloser locks out, i.e., permanently opens the circuit, after a preset number of operations, thereby isolating the faulted section of the system.

SUMMARY

According to an exemplary embodiment, a circuit interrupting device for use within a power distribution system includes a housing containing a circuit interrupting mechanism. A battery tube is positioned in the housing. A battery assembly is configured to be inserted into the battery tube. The battery assembly includes a battery assembly body having a first end and a second end. A battery is positioned within the battery assembly body. A positive contact is electrically connected to the battery and is exposed from the second end of the battery assembly body. A negative contact is electrically connected to at least one of the one or more batteries and exposed from the second end of the battery assembly body.

According to another exemplary embodiment, a circuit interrupting device for use within a power distribution system includes a housing containing a circuit interrupting mechanism. A battery tube is positioned in the housing. The battery tube has a first mating feature, a first positive contact, and a first negative contact. A battery assembly is configured to be inserted into the battery tube. The battery assembly includes a second mating feature configured to mate with the first mating feature, a second positive contact, and a second negative contact. The first and second mating features ensure a proper alignment of the battery assembly in the battery tube to electrically connect the first and second positive contact and electrically connect the first and second negative contacts.

According to another exemplary embodiment, a circuit interrupting device for use within a power distribution system includes a housing containing a circuit interrupting mechanism. A battery tube is positioned in the housing. A battery assembly is configured to be inserted into the battery tube. The battery assembly includes a battery assembly body having a first end and a second end and a keyed body portion. A battery is positioned in the battery assembly body. A cap is connected to the first end of the battery assembly body. A contact casing is connected to the second end of the battery assembly body. The contact casing has a casing keyed portion aligned with the keyed body portion. A positive contact is electrically connected to the battery and at least partially positioned in the contact casing. A negative contact is electrically connected to the battery and at least partially positioned in the contact casing.

BRIEF DESCRIPTION OF THE DRAWINGS

The aspects and features of various exemplary embodiments will be more apparent from the description of those exemplary embodiments taken with reference to the accompanying drawings.

DETAILED DESCRIPTION OF EXEMPLARY EMBODIMENTS

Figure 1:
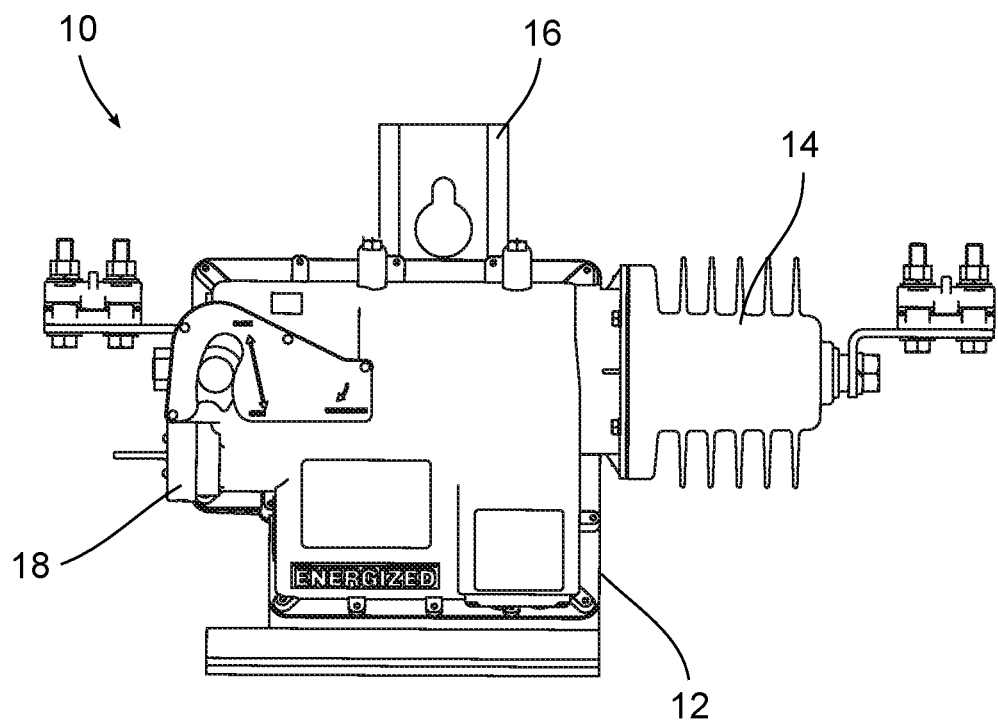
FIG. 1 is a front view of an exemplary automatic recloser.

FIG. 1 shows, a circuit interrupting device for a power distribution system, such as an automatic recloser 10, although certain aspects of the circuit interrupting device can be incorporated into other circuit interrupting devices, such as circuit breakers that do not reclose. The recloser 10 generally includes a housing 12 containing a circuit interrupting mechanism 14 used in conjunction with an actuator, which is electrically controlled by an electronic control assembly. The circuit interrupting mechanism 14 is preferably a vacuum interrupter, but can be any type of interrupting means such as SF6 gas interrupter or a solid dielectric interrupter. The actuator is preferably a solenoid, but may be any known electrical or mechanical actuating or operating mechanism. The recloser 10 can include a mounting bracket 16 for mounting the housing 12 to a utility pole or other structure.

A battery 18 can be used, for example, as a power source for the electronic control assembly in order to close the vacuum interrupter contacts, such as when initially installing the recloser 10 and after lock-out due to a permanent fault. The battery 18 can be used for other purposes as well, such as powering peripheral devices coupled to the recloser or providing power to external indicators, such as external visual indicators. The battery 18 is received within the housing 12 and removably secured thereto. Additional components and operation of the recloser 10 as understood by one of ordinary skill in the art are further described in U.S. Pat. No. 6,794,596, which is hereby incorporated by reference in its entirety.

Figure 2:
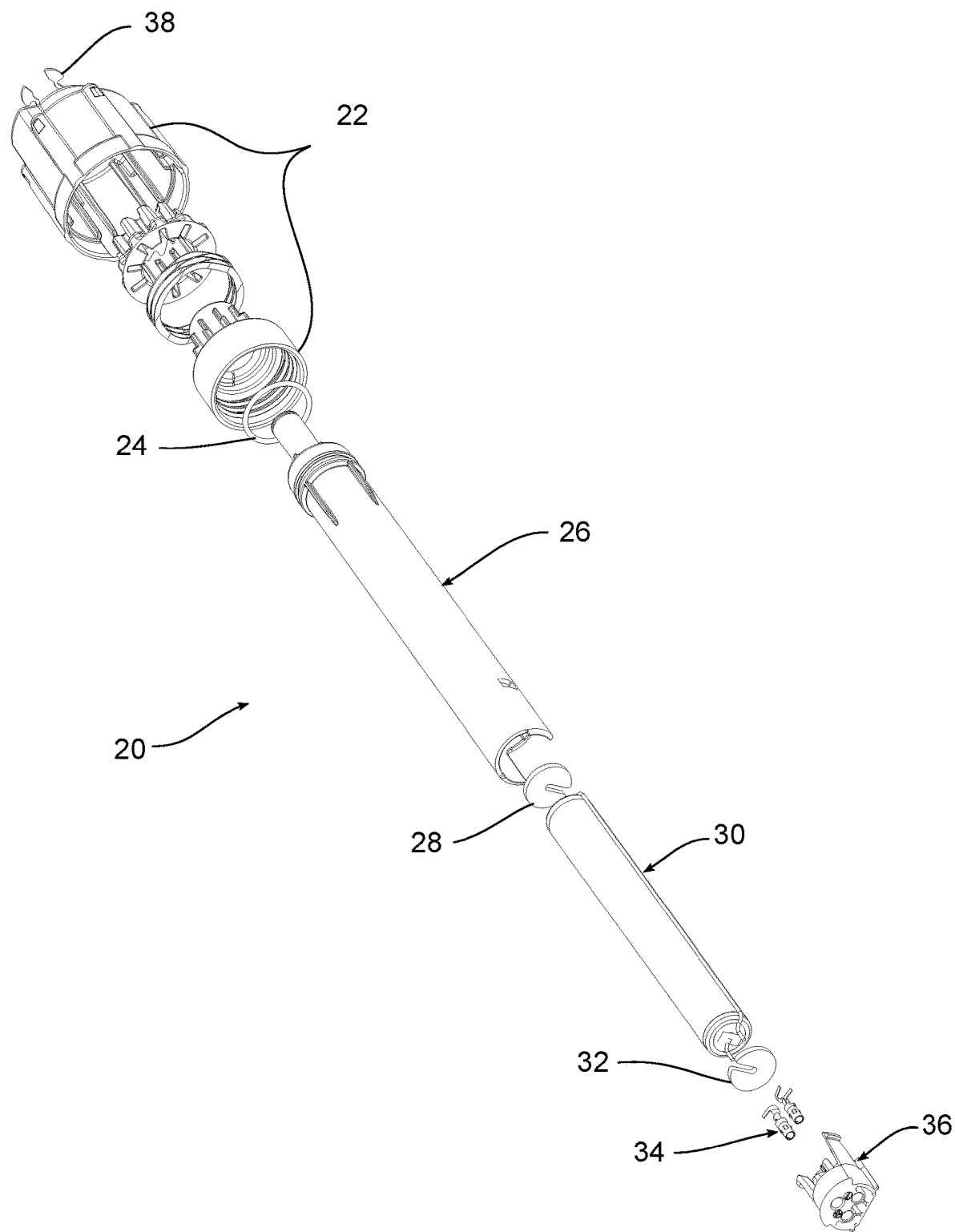
FIG. 2 is an exploded view of an exemplary battery assembly for use with a recloser.
Figure 3:
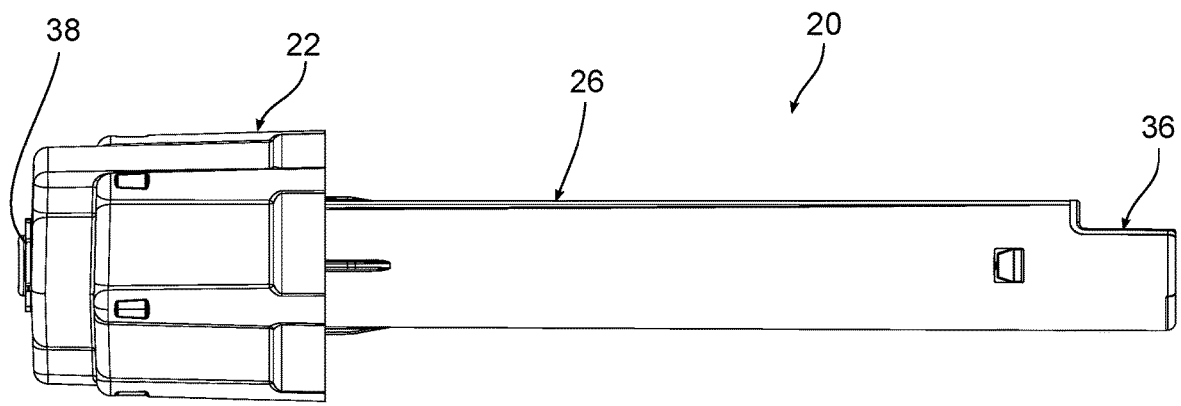
FIG. 3 is a side view of the assembled battery assembly.
Figure 4:
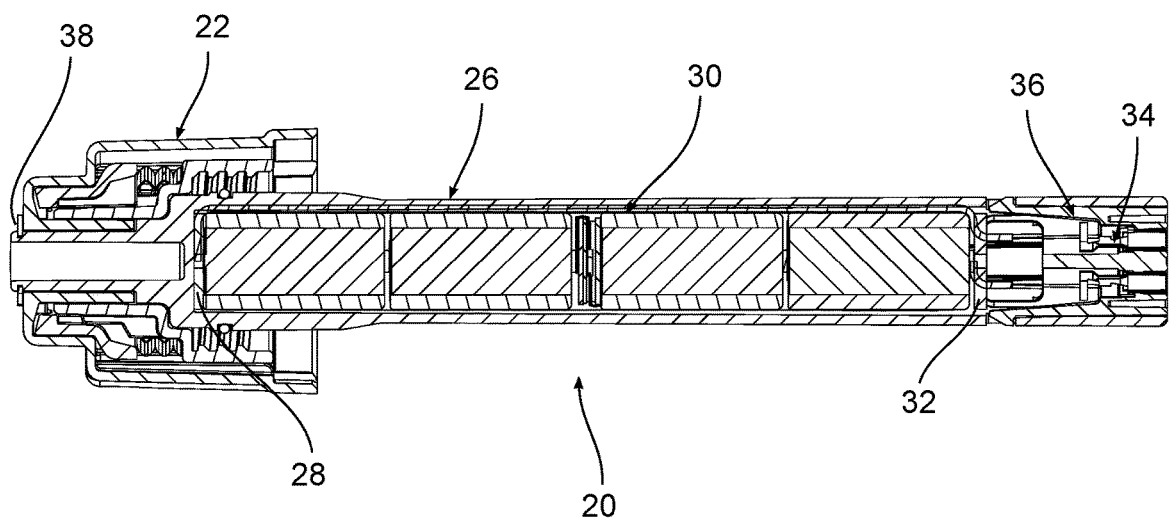
FIG. 4 is a side, sectional view of the battery assembly rotated 90 degrees from FIG. 3.

FIGS. 2-4 show an exemplary embodiment of a battery assembly 20 that includes a cap assembly 22, a seal (e.g. an O-ring) 24, a battery assembly body 26, a first battery pad 28, a battery 30, a second battery pad 32, a set of contacts 34, and a contact casing 36. When assembled, a portion of the battery assembly body 26 extends through the cap assembly 22 and is held in place by a retainer 38, for example an E-clip. The battery 30 and battery pads 28, 32 are retained in the battery assembly body 26 and the contact casing 36 is connected to the battery assembly body 26.

Figure 5:
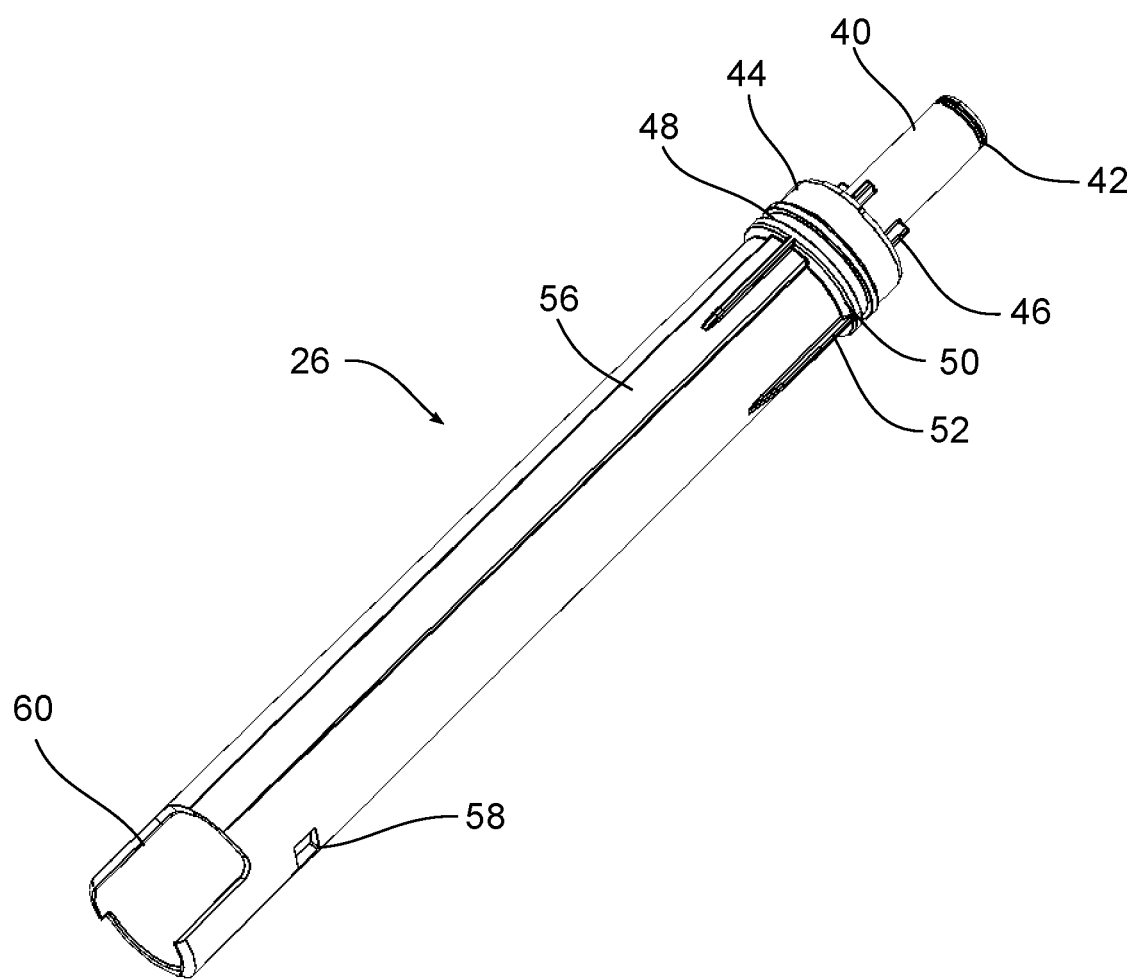
FIG. 5 is a perspective view of an exemplary battery assembly body.
Figure 6:
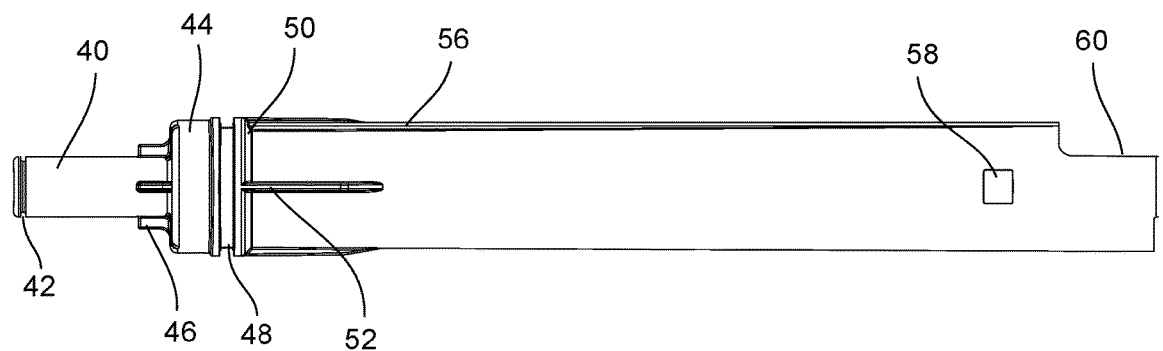
FIG. 6 is a side view of FIG. 5.
Figure 7:
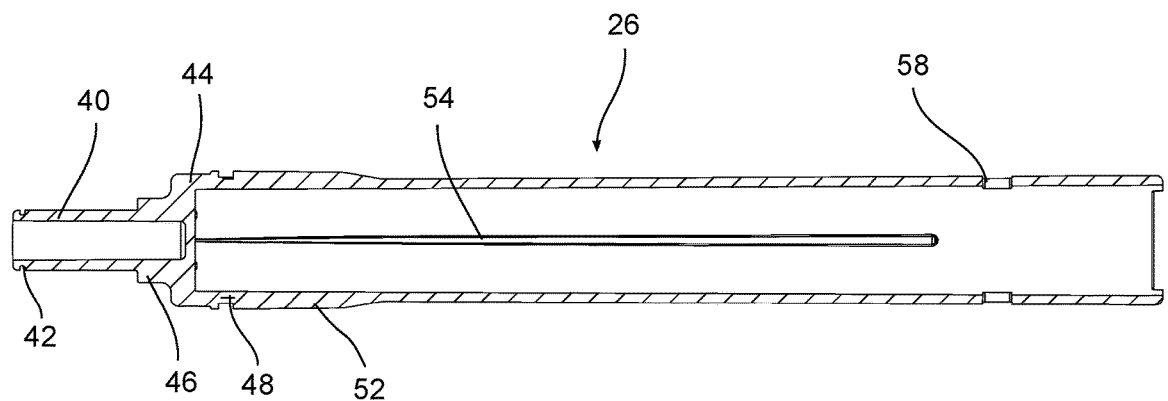
FIG. 7 is a side, sectional view of the battery assembly body rotated 90 degrees from FIG. 6.

FIGS. 5-7 show an exemplary embodiment of a battery assembly body 26 having a front portion that includes a shaft 40 that extends through the cap assembly 22 and includes a first annular groove 42 to receive the retainer 38 (see, FIG. 4). The shaft 40 extends to a base 44 having a width larger than the shaft 40. One or more ribs 46 extend from the base and along a portion of the shaft 40. The ribs 46 provide support to the shaft 40 and engage with the cap 20 and can additionally provide spacing between the cap 20 and the battery assembly body 26. A second annular groove 48 is provided below the base 44 to receive a gasket, for example the O-ring 24 shown in FIG. 2.

A middle portion of the battery assembly body 26 includes a flange 50 positioned proximate the second annular groove 48 shown in FIG. 5. One or more ribs 52 extend from the flange 50 along the battery assembly body 26. As previously mentioned, the ribs 52 can provide support for the battery assembly body 26 and help to space the battery assembly body 26 from a housing, such as when the battery assembly body 26 is placed in a battery tube in a recloser 10. The middle portion of the battery assembly body 26 receives the battery 30. As shown in FIG. 7, the interior of the battery assembly body 26 includes a longitudinal groove 54 for receiving a portion of the battery 30 as explained below. In various exemplary embodiments, a keyed protrusion 56 can be provided on an outer surface of the battery assembly body 26, as best shown in FIGS. 5 and 6. The keyed protrusion 56 is raised from the major outer surface of the battery assembly body 26 and has a different cross section.

As shown in FIG. 6, a rear portion of the battery assembly body 26 includes one or more openings 58. The openings 58 receive a portion of the contact casing 36 to securely fasten the contact casing 36 to the battery assembly body 26, for example to provide a snap-fit connection that still allows the contact casing 36 to be removed if desired. Two openings 58 are shown here, although fewer or more openings 58 can be used depending on the desired connection. One end of the battery assembly body 26 also includes a keyed portion 60 that has a different cross section (for example a flat portion) that can assist with proper alignment of the battery assembly 20 during installation. The keyed portion 60 may include grooves, extruded portions, or a different key configuration in other embodiments.

Figure 8:
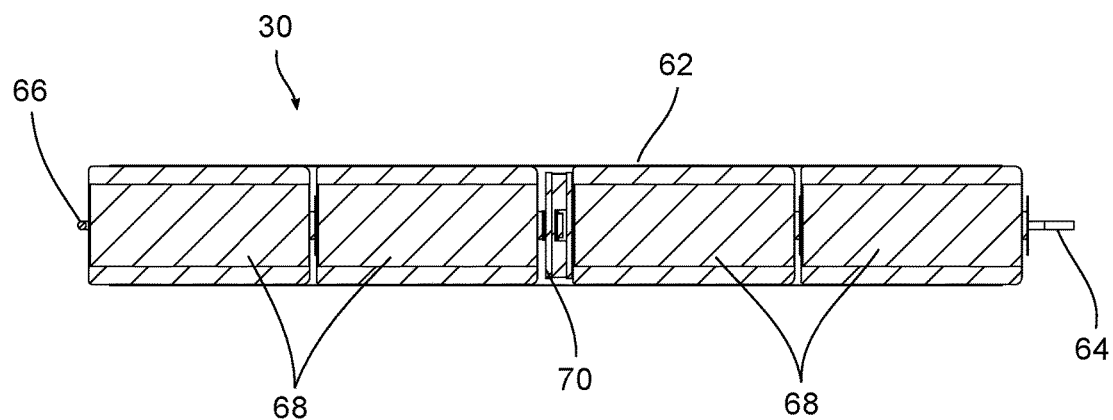
FIG. 8 is a side, sectional view of an exemplary battery assembly.

FIG. 8 shows an exemplary embodiment of the one or more batteries 30 that includes an outer casing 62, a positive lead 64, and a negative lead 66. The negative lead 66 extends outside of the casing and is received in the longitudinal groove 54 in the battery assembly body 26. In one exemplary configuration, the one or more batteries 30 are formed from two sets of two lithium ion cell batteries 68 separated by a poly-switch fuse assembly 70. In other embodiments, different types of batteries and/or configurations can be utilized.

Figure 9:
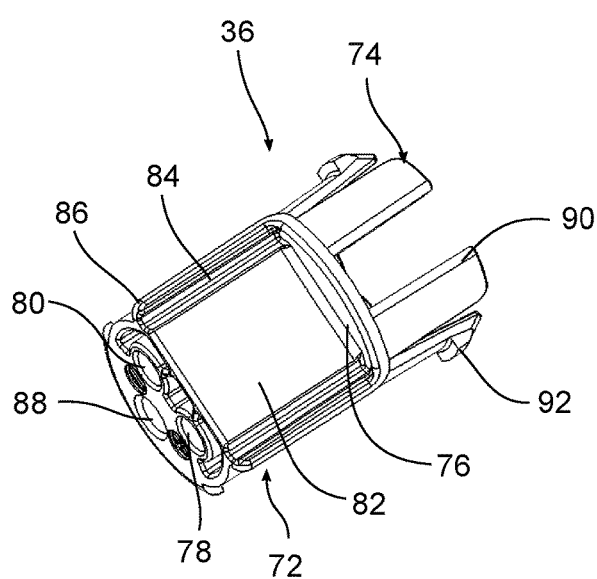
FIG. 9 is a rear perspective view of an exemplary contact casing.

FIGS. 9-12 show an exemplary embodiment of the contact casing 36. The contact casing 36 includes a rear portion 72 that is positioned adjacent to and the outer wall of the battery assembly body 26 and a front portion 74 that extends into the battery assembly body 26. As shown in FIG. 9, a semicircular wall 76 partially separates the front portion 74 from the rear portion 72.

The rear portion 72 includes a positive terminal opening 78 and a negative terminal opening 80 provided in an outer face of the contact casing 36. The contact casing 36 also includes a keyed portion 82 that aligns with the keyed portion 60 of the battery assembly body 26. In one embodiment, the keyed portion 82 includes a flat surface that is bound by a pair of channels or grooves 84. Tabs 86 extend upwardly from the grooves 84. The combination of the tabs 86 and grooves 84 allow for proper alignment and a secure fit into the battery assembly body 26. A lower opening 88 is positioned below the positive and negative terminal openings 78, 80.

Figure 10:
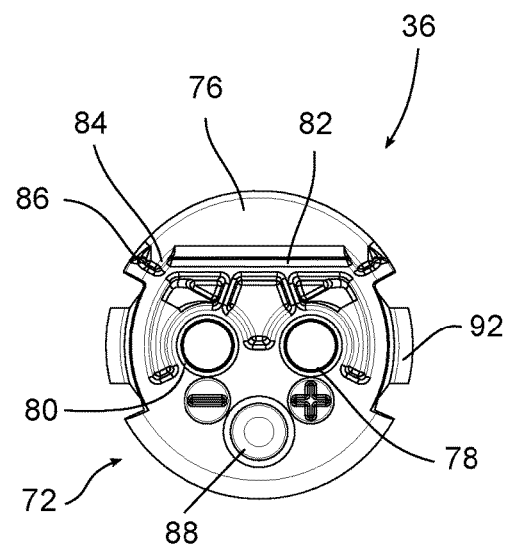
FIG. 10 is a rear view of FIG. 9.

As shown in FIG. 10, the lower opening 88 has a substantially cylindrical configuration, although other shapes and configurations can be used. For example, different rectilinear or curvilinear shapes can be used. The mouth of the lower opening 88 can be wider or substantially funnel-shaped to help provide alignment with a mating protrusion.

Figure 11:
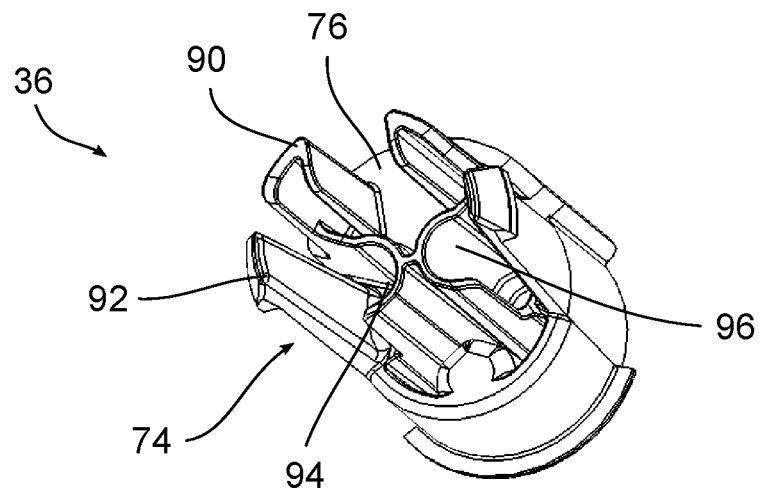
FIG. 11 is a front perspective view of FIG. 9.
Figure 12:
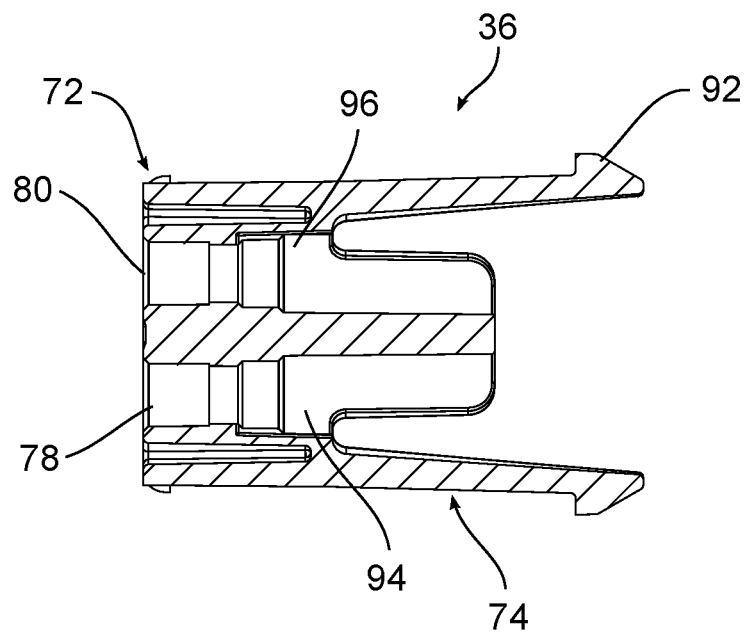
FIG. 12 is a top, sectional view of FIG. 9.

The front portion 74 includes a set of protrusions 90 that extend from the circular wall 76 as shown in FIG. 11. One or more cantilevered arms 92 having a hook member are used to connect the contact casing 36 to the battery assembly body 26. The cantilevered arms 92 form a detent, such as a releasable snap-fit connection, although other connections can be used. As illustrated in FIG. 12, a positive conduit 94 and a negative conduit 96 extend to the positive terminal opening 78 and the negative terminal opening 80, respectively. The contacts 34 (see, FIG. 4) are connected to respective battery leads through a conductor and extend into the respective conduits 94, 96 and are exposed through the respective terminal openings 78, 80 when the contact casing 36 is affixed to the battery assembly body 26.

Figure 13:
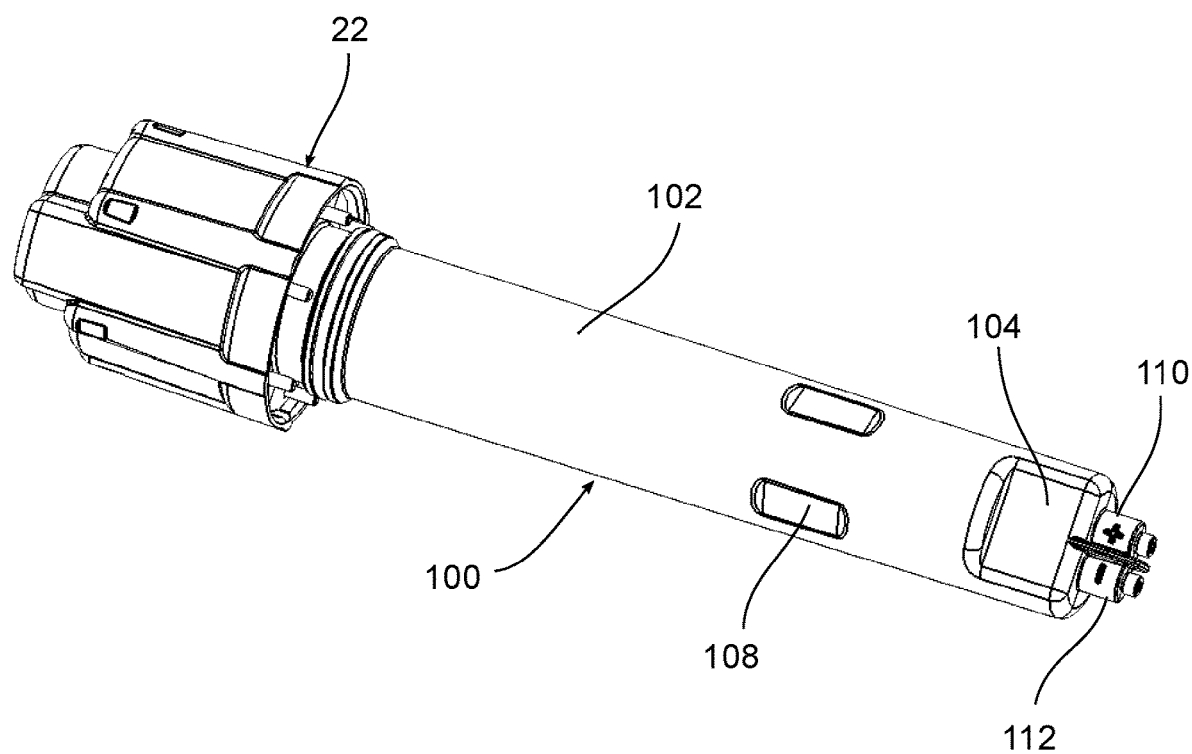
FIG. 13 is a side, sectional view of the battery assembly connected to an exemplary battery tube.

According to an exemplary embodiment, the assembled battery assembly 20 is inserted into a battery receptacle, or tube 100 coupled to the recloser 10. FIG. 13 shows an exemplary battery tube 100 that includes a substantially cylindrical body 102 for receiving the battery assembly body 26. The battery tube 100 is shown separately from the recloser housing 12 for clarity. In some embodiments, the battery tube 100 is separable from the housing 12 or formed integrally within the housing 12.

Figure 14:
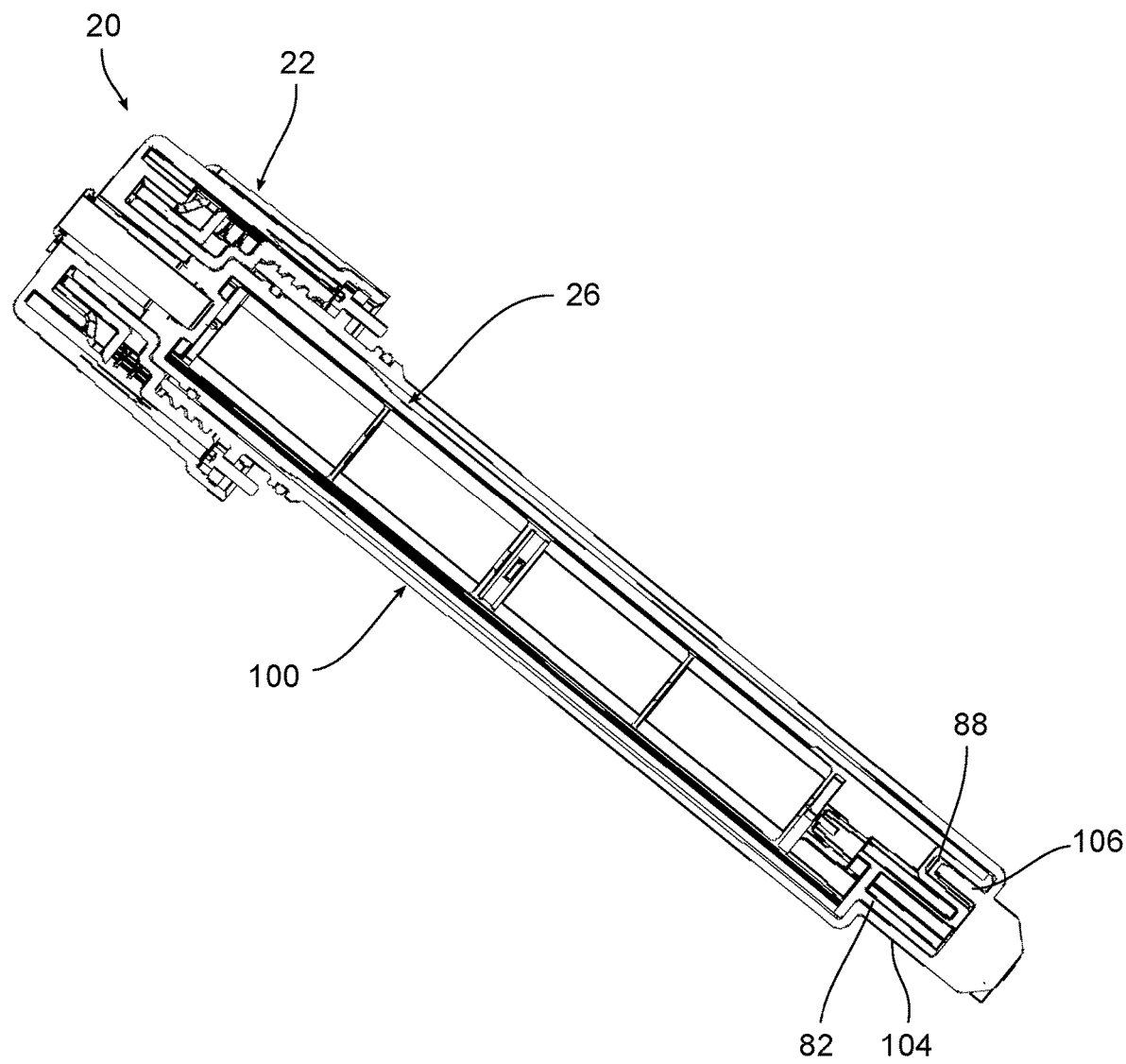
FIG. 14 is a side, sectional view of the battery assembly connected to an exemplary batter tube as shown in FIG. 13.
Figure 15:
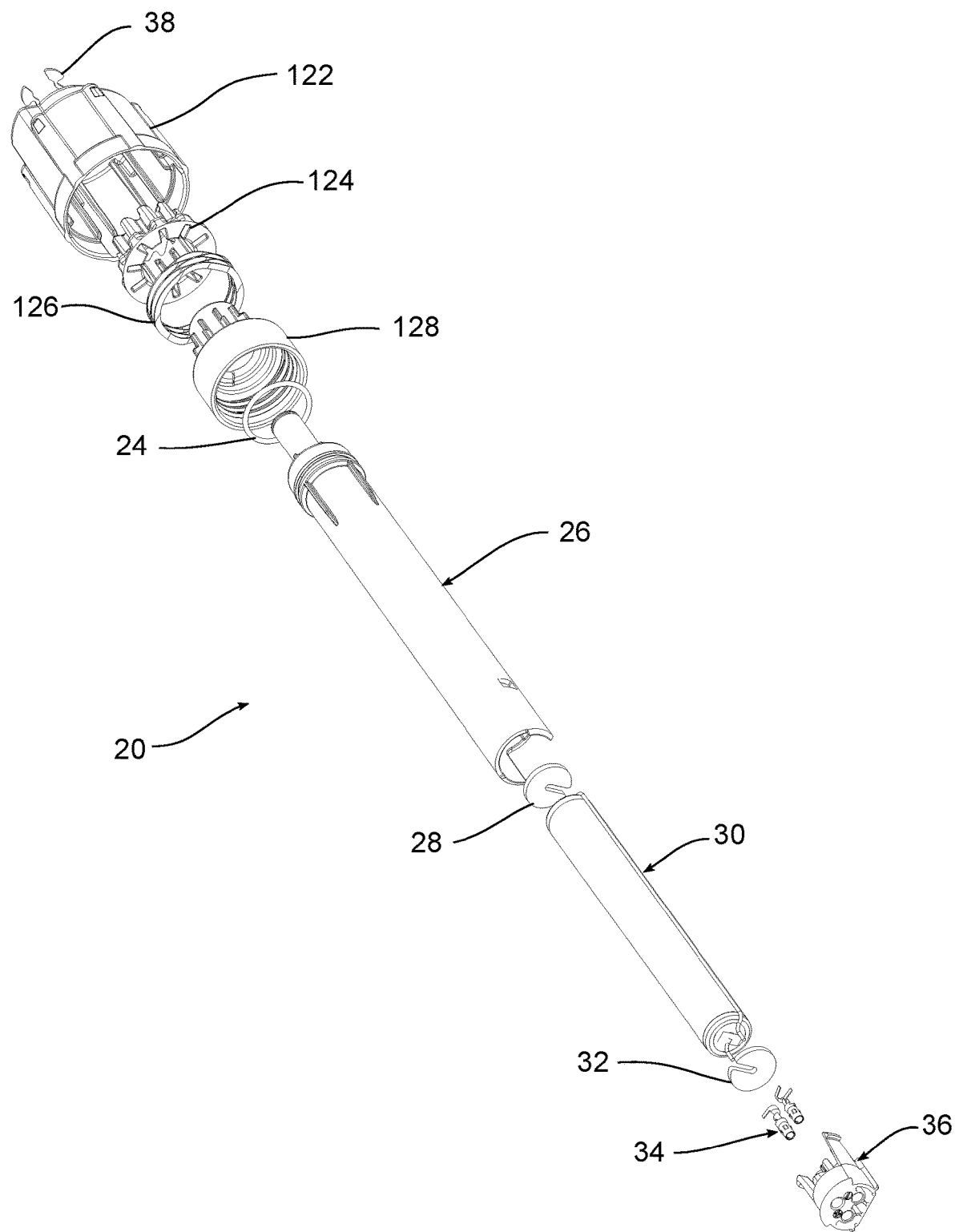
FIG. 15 is an exploded view of an exemplary battery assembly for use with a recloser.
Figure 16:
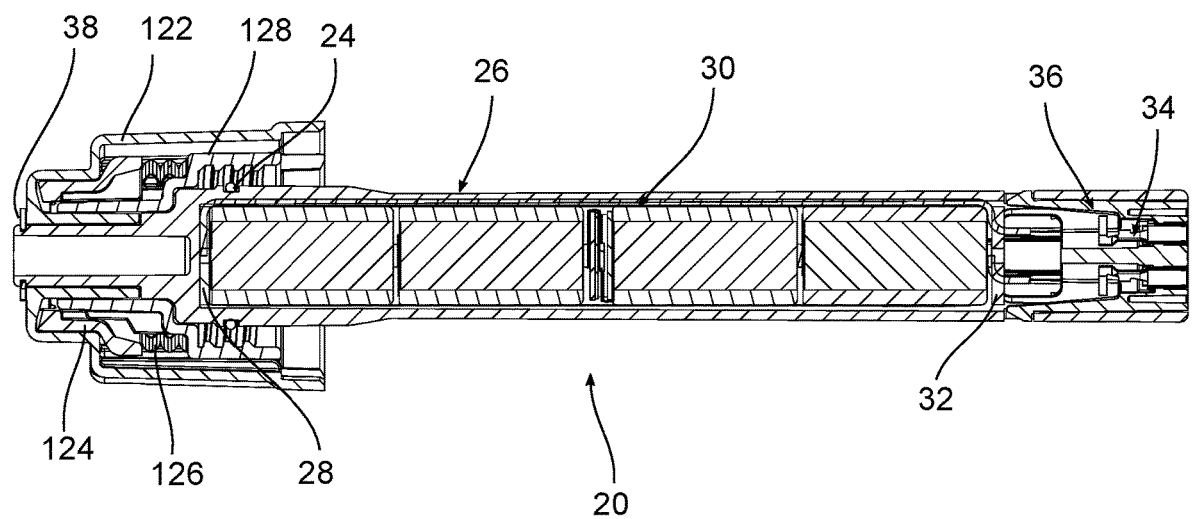
FIG. 16 is a side, sectional view of the battery assembly.

The cylindrical body 102 includes a keyed portion 104 that mates with the keyed portion 60 of the battery assembly body 26 and the keyed portion 82 of the contact casing 36. A protrusion 106 extends from a wall of the battery tube 100 that mates with or otherwise extends into the lower opening 88 of the contact casing 36 as shown in FIG. 14. A groove or channel can also be provided in the battery tube 100 to receive the keyed protrusion 56. In an exemplary embodiment illustrated in FIG. 13, the groove or channel is at least partially defined by a pair of indents 108 formed in the battery tube 100. The battery tube 100 can also include, or be connected to, a positive contact no and a negative contact 112 that electrically connect to the contacts 34 of the battery assembly 20. For example, a positive pin and a negative pin can extend into the positive terminal opening 78 and the negative terminal opening 80, respectively, and connect to the positive and negative contacts 34.

Typically, batteries used for reclosers must be carefully and specifically positioned by an installer to place the battery contacts in a correct alignment. This is dangerous for an installer who is under hazardous conditions due to the potential for electrocution and exposure to harsh weather elements. The keyed portions of the battery assembly 20 eliminate the difficulties in aligning the battery assembly in the battery tube 100. The keyed portions also help prevent unwanted rotation and ensure a secure fit of the battery assembly 20 in the battery tube 100 while in use, which can be caused by, e.g., vibrations in the recloser 10, line current, recloser operations, or environmental conditions such as wind or thermal fluctuations. Also, typical utility line circuit interrupter batteries do not include both positive and negative contacts at a single end, which helps provide an easier connection and alignment. Although a particular shape and configuration is shown for the mating keyed portions, other shapes and configurations can be used that provide a mating alignment in a particular orientation that allows for easier installation of the battery assembly 20.

FIGS. 15-26 shows an exemplary embodiment of the cap assembly 22 in greater detail. The cap assembly 22 includes a cap 122, a ratchet member 124, a biasing member 126, and a first connector 128.

Figure 17:
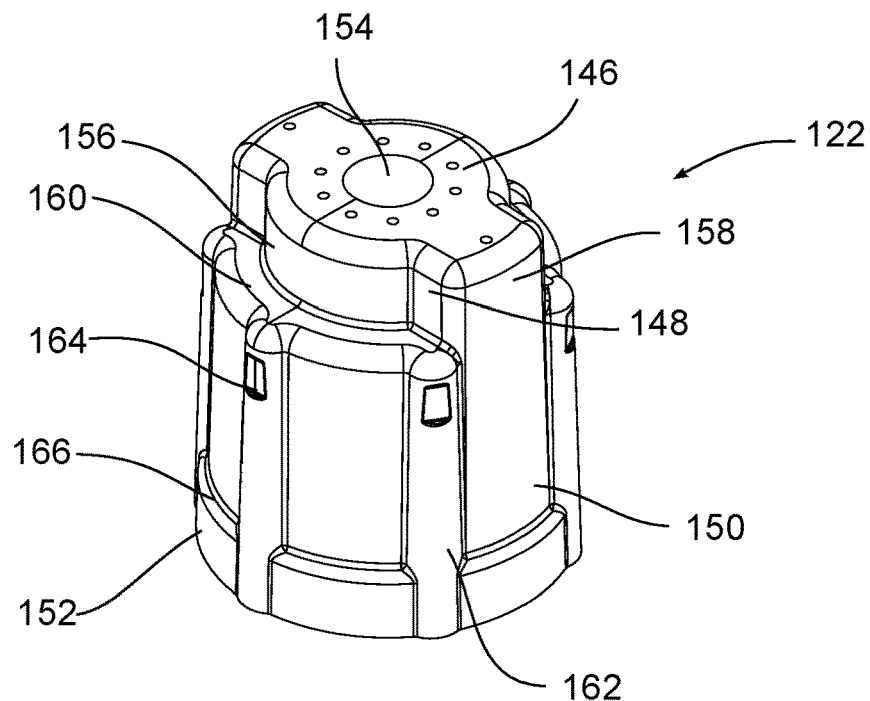
FIG. 17 is a perspective view of an exemplary cap.
Figure 18:
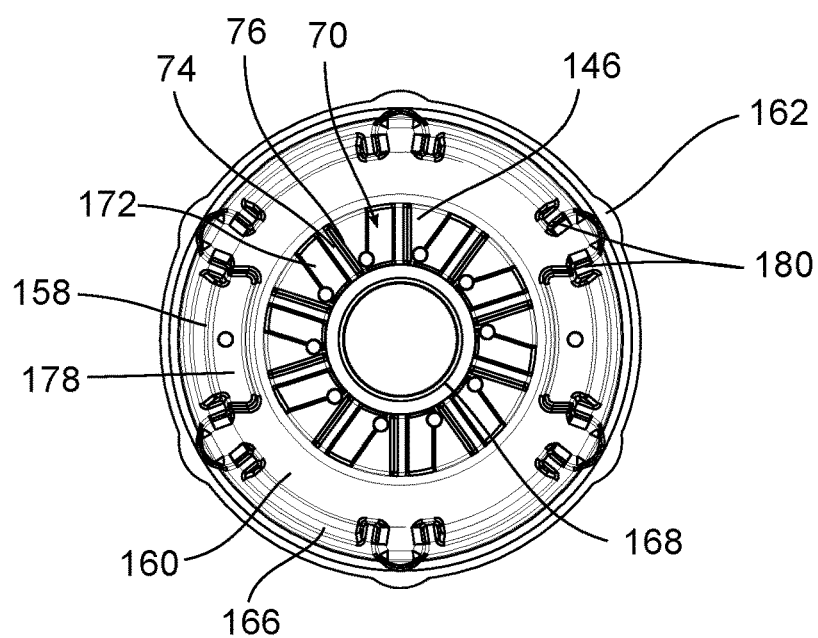
FIG. 18 is a rear view of FIG. 17.
Figure 19:
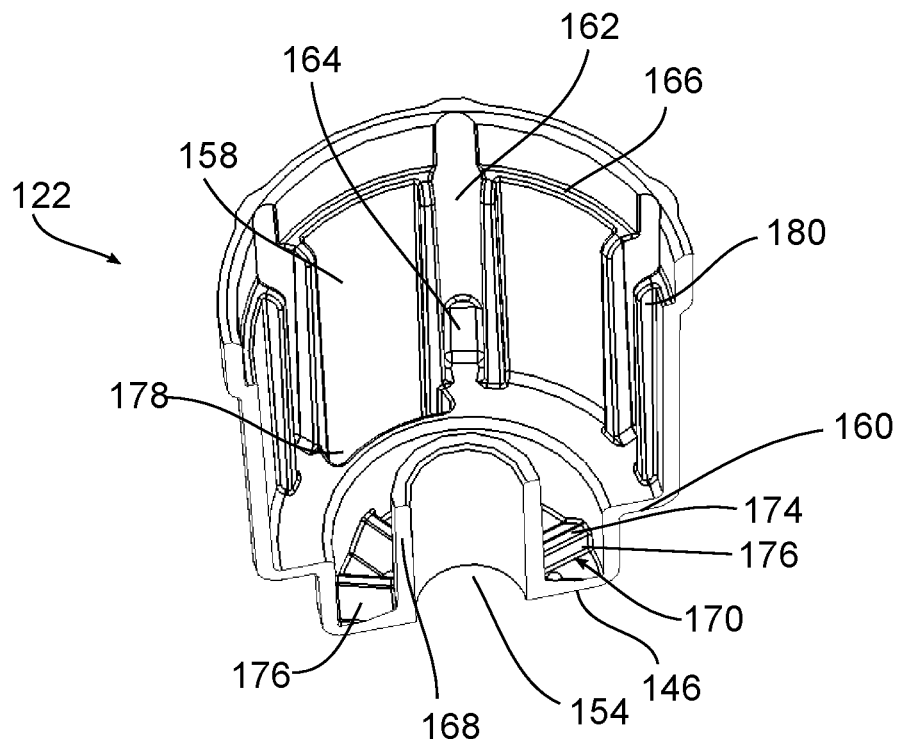
FIG. 19 is a rear, sectional view of FIG. 17.

FIGS. 17-19 show an exemplary embodiment of the cap 122. As shown in FIG. 17, the cap 122 includes a front wall 146 a first section 148 extending from the front wall 146, a second section 150 extending from the first section 148, and a third section 152 extending from the second section 150. A central opening 154 extends through the cap for receiving at least a portion of the assembly body 26. In an exemplary embodiment, the assembly body is rotatably connected to the cap by the first connector 128 and secured by the retainer 38.

The first section 148 of the cap 122 includes a substantially cylindrical portion 156 and a pair of shoulders 158 extending from the cylindrical portion 156. The first and second shoulders 158 have a substantially rectangular configuration, although other configurations such as differently shaped extruded portions or indentations such as channels may be utilized. In an exemplary embodiment, the first and second shoulders 158 extend the height of the cap 122 from the first section 148 to the third section 152. A first ledge 160 is formed between the first section 148 and the second section 150. The second section 150 further includes one or more protrusions 162, each protrusion having a notch 164. The protrusions 162 can extend to the bottom of the cap and at least partially define an arcuate recessed portion. A second ledge 166 is formed between the second section 150 and the third section 152. The third section 152 is wider than the second section 150.

FIGS. 18 and 19 show the interior of the cap 122. A boss 168 extends from the front wall 146 into the interior of the cap 122 around the central opening 154. The rear portion of the front wall 146 includes a plurality of first teeth 170. The teeth 170 have a substantially right-trapezoidal configuration with an angled side 172, a substantially planar top 174, and a vertical side 176. As illustrated in FIG. 19, a depression 178 is provided adjacent each of the first and second shoulders 158 and a pair of tabs 180 bound the interior of each protrusion 162. The depression 178 and tabs 180 ensure proper placement, a secure fit and robust grip for a utility tool, e.g., a hotstick, during ground installation of the battery.

Figure 20:
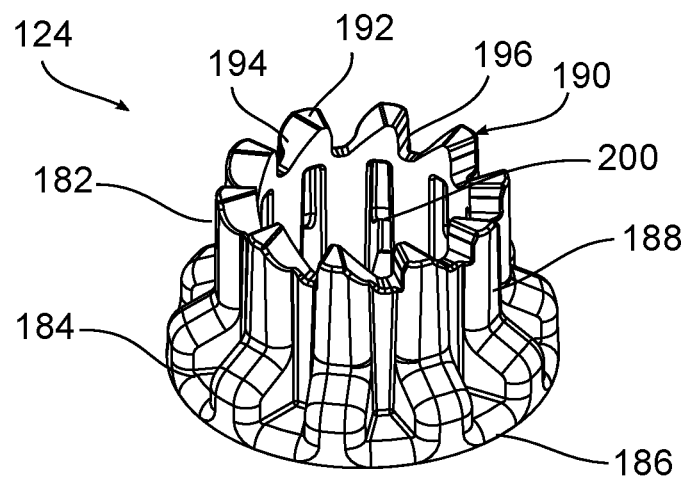
FIG. 20 is a perspective view of an exemplary ratchet member.
Figure 21:
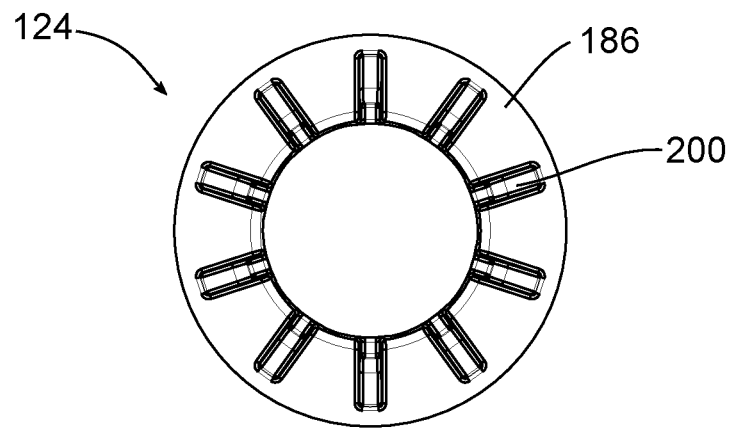
FIG. 21 is a rear view of FIG. 20.

FIGS. 20 and 21 show an exemplary embodiment of the ratchet member 124. The ratchet member 124 includes a first section 182 having a first width and a second section 184 having a second width larger than the first width in one embodiment. In this embodiment, the components are substantially cylindrical and the first and second widths are a given diameter relative to the size of the component, for example a normalized outer diameter. As best shown in FIG. 21, a flange 186 is included along bottom of the second section 184.

On the exterior of the ratchet 124, the first section 182 includes a set of projections 188 that terminate as a plurality of second teeth 190. The second teeth 190 include a top portion 192, an angled side 194, and a substantially vertical side 196. The projections 188 include hip portions that increase in width toward the flange 186. In some embodiments, a plurality of slots 200 are positioned along the interior wall of the ratchet member 124. The slots 200 have a first portion with a first slot width in the flange 186 and the hip portion, and a second portion having a second slot width that is less than the first slot width in the first section 182.

Figure 22:
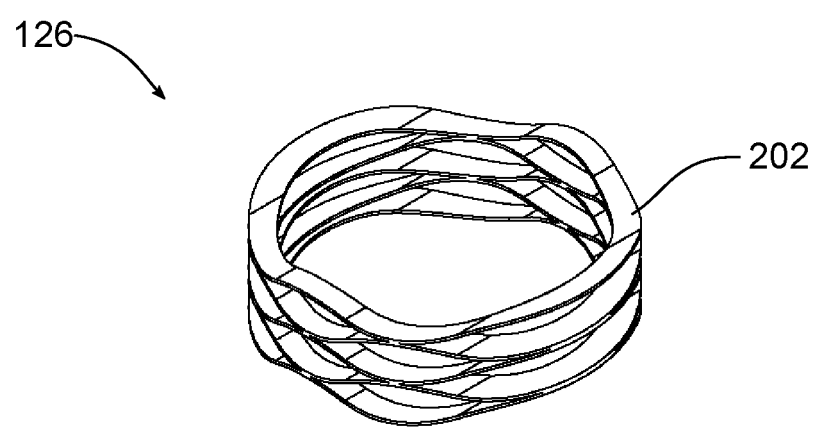
FIG. 22 is a perspective view of an exemplary biasing member.

FIG. 22 shows an exemplary embodiment of the biasing member 126 in the form of a set of wave springs 202. The wave springs 202 are stacked and may be connected or formed as a single component in some embodiments.

Figure 23:
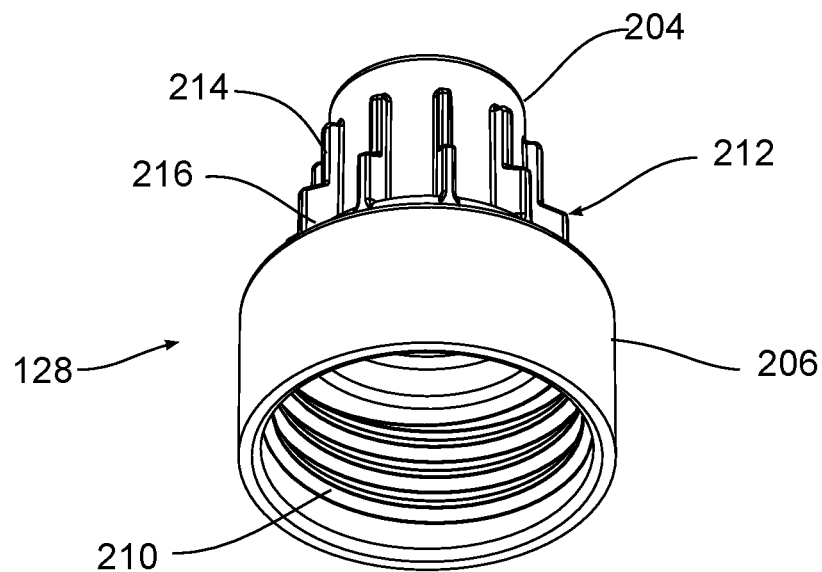
FIG. 23 is a perspective view of an exemplary threaded member.
Figure 24:
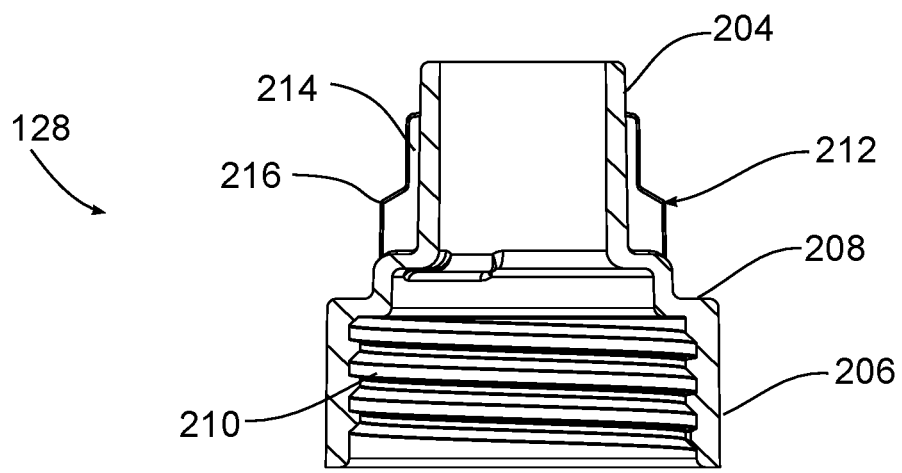
FIG. 24 is a side, sectional view of FIG. 23.

FIGS. 23 and 24 show an exemplary embodiment of the first connector 128. In one embodiment, the first connector 128 may include a threaded component having a front section 204 and a rear section 206. The rear section 206 has a width greater than the front section 204 and a circular shoulder, or ledge 208 is formed between the front section 204 and the rear section 206. Additionally, the interior of the rear section 206 includes an internal threaded wall 210. The exterior of the front section 204 includes one or more tines 212 extending from a cylindrical surface and above the circular shoulder 208. The tines 212 include a first upper portion 214 and a second base portion 216 that is wider than the first upper portion 214.

Figure 25:
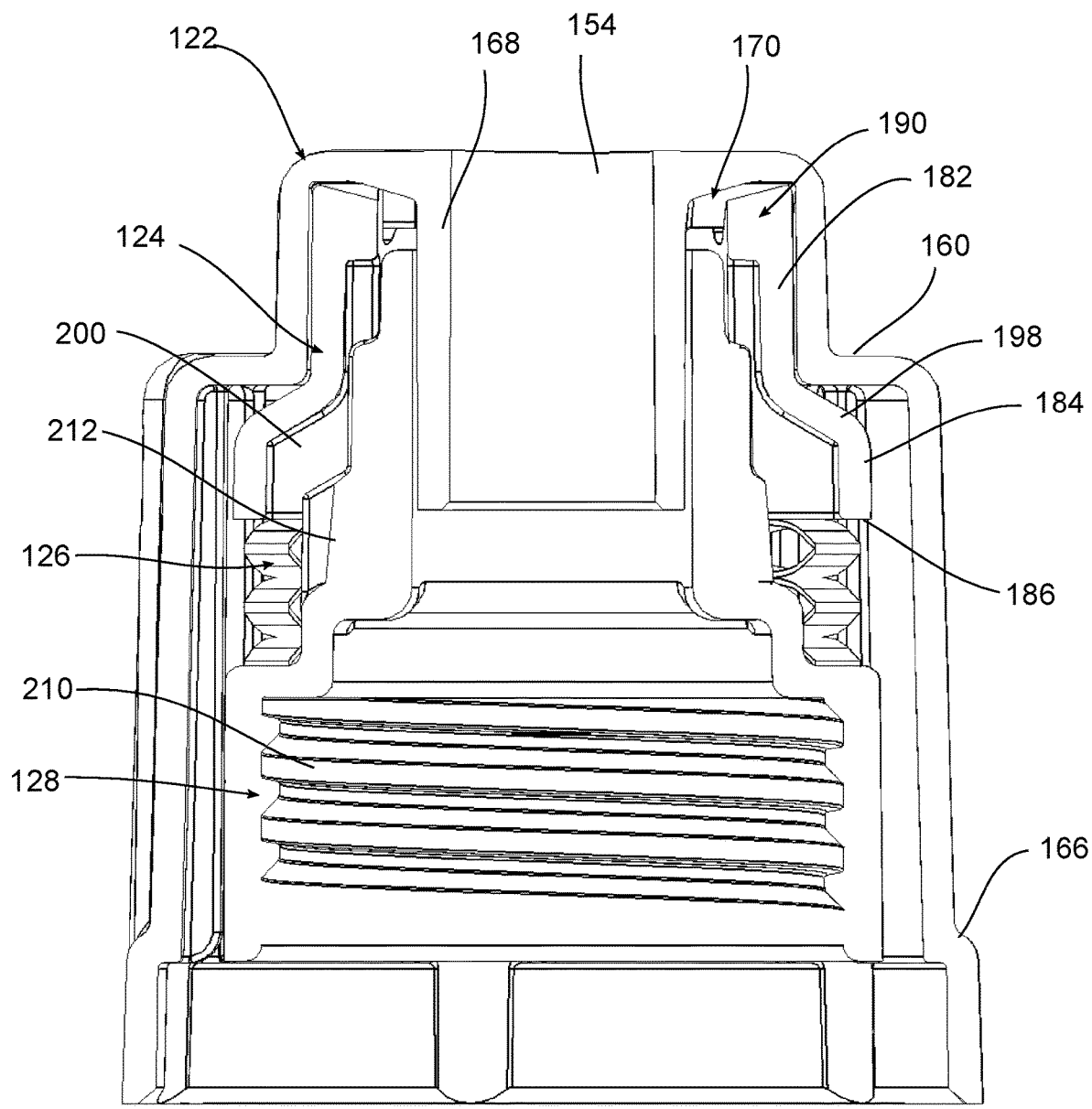
FIG. 25 is a side, sectional view of the assembled cap, ratchet member, biasing member, and threaded member.

As shown in FIG. 25, when assembled, the biasing member 126 is positioned over the first connector 128 resting on the circular shoulder 208. The ratchet member 124 is then positioned over the biasing member 126 and the first connector 128, with the tines 212 extending into the slots 200 of the ratchet member 124 and the biasing member 126 engaging the flange 186. The ratchet member 124, biasing member 126, and first connector 128 are inserted into the cap 122, with the boss 168 extending into the front section 204 of the first connector 128 and the first teeth 170 of the cap 122 engaging the second teeth 190 of the ratchet member 124. The cap 122, ratchet member 124, biasing member 126, and first connector 128 combine to form a torque limiter that prevents the first connector 128 from being over tightened.

Figure 26:
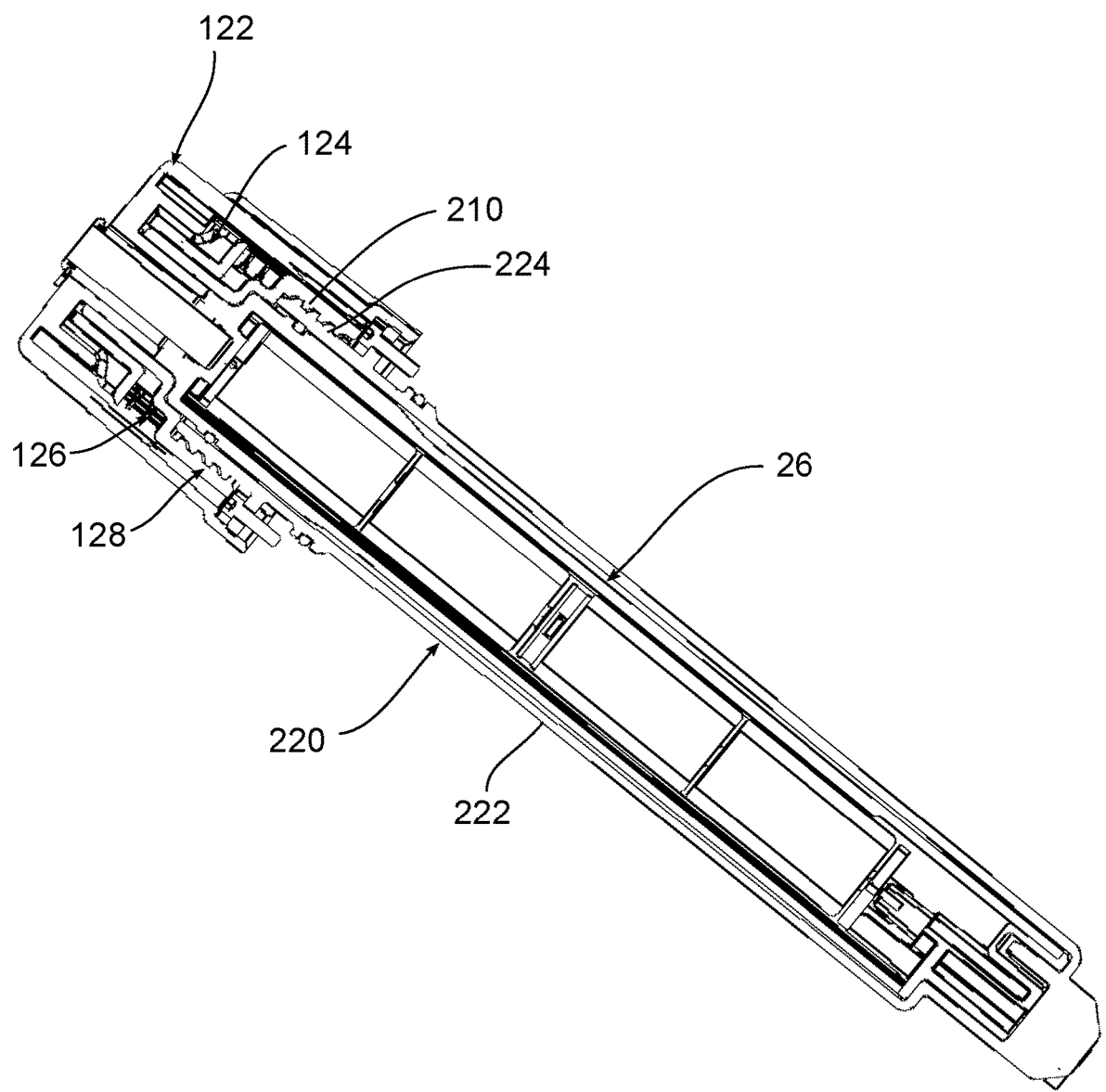
FIG. 26 is aside, sectional view of the battery assembly connected to an exemplary battery tube.

According to an exemplary embodiment, the battery assembly 20 is inserted into a battery tube 220 coupled to the recloser 10. FIG. 26 shows an exemplary battery tube 220 that includes a substantially cylindrical body 222 for receiving the assembly body 26 and an external connector 224 that mates with the first connector 128 of the battery assembly 20. The battery tube 220 is shown as separated from a recloser 10 housing 12 for clarity. In some embodiments, the battery tube 220 is separable from the housing 12. In other embodiments, the battery tube 220 is formed integrally with the recloser housing 12. Additionally, it should be understood that although a cylindrical tube is illustrated, the battery tube 220 may be any type of receptacle capable of receiving the battery assembly 20 and allowing power to be supplied from the battery to the circuit interrupting device.

During installation, the cap 122 can be rotated to connect, e.g., via threading, the first connector 128 with the external connector 224 of the battery tube 220. The teeth 190 of the ratchet member 124 are normally biased into engagement with the teeth 170 of the cap 122, rotatably fixing the cap 122, ratchet member 124, and the first connector 128 together. As the first connector 128 is rotated, the amount of torque increases which in turn increases the axial force exerted on the ratchet member 124 through engagement of the first and second sets of teeth 170, 190. When a torque limit is reached, the biasing member 126 is compressed and the ratchet member 124 at least partially disengages from the cap 122. This disengagement causes the cap 122 to rotate relative to the ratchet 124. As the teeth 170, 190 are misaligned and slide relative to one another, an audible sound is produced to alert the user that the torque limit has been reached. In some embodiments, the torque limit is adjustable by through modification of the spring force in the biasing member 126. In an exemplary embodiment, the assembly body 26 maintains a substantially consistent orientation throughout the connection process.

Figure 27:
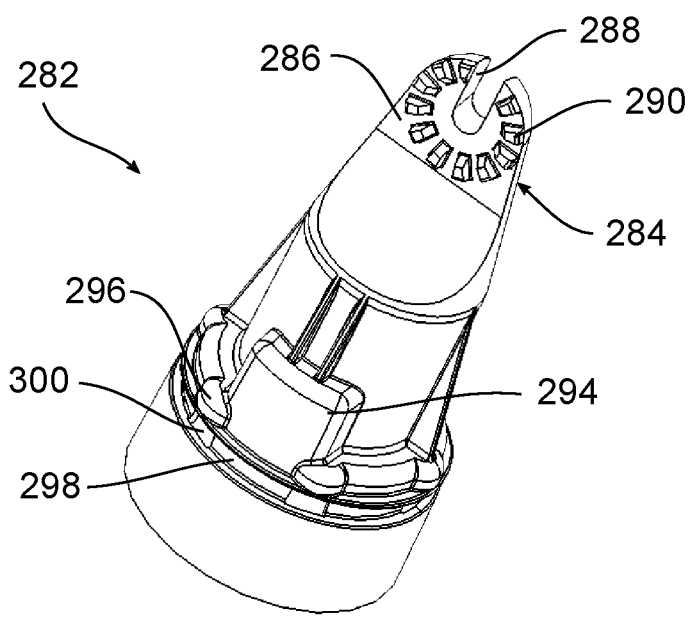
FIG. 27 is a perspective view of an exemplary hot-stick adaptor.

FIGS. 27-30 show an exemplary embodiment of a hot-stick adaptor 282. Hot sticks are used in various power line installations and maintenance procedures to engage live, or energized, devices in a power distribution system. The hot-stick adaptor 282 is configured to connect to the cap 22 and to receive a hot-stick (not shown) such that the hot-stick can be used to install or uninstall the battery assembly 20 to a recloser 10 from the ground. The hot-stick adaptor 282 includes a connecting portion 284 configured to receive a standard hot-stick. For example, as shown in FIG. 27, the connecting portion 284 includes a substantially circular base 286 with a radial slot 288. A plurality of teeth 290 extend from the substantially circular base 286. The teeth are configured to mate with corresponding teeth on a hot stick. In some embodiments, a fastener is utilized with the radial slot 288 to connect the hot-stick to the hot-stick adaptor 282.

The hot-stick adaptor 282 includes one or more features that mate with features of the cap 122. For example, shown in FIG. 28, the hot-stick adaptor 282 includes first and second adapter shoulders 294 at least partially defining open areas configured to receive the cap shoulders 158. The hot-stick adaptor 282 also includes a set of protrusions 296 spaced radially around the hot-stick adaptor 282. The protrusions 296 at least partially define open areas configured to receive the cap protrusions 162. A channel 298 is formed in the hot-stick adaptor 282 having openings 300 that are aligned with the protrusions 162. As best shown in FIG. 29, the openings 300 are also aligned with the notches 164 in the cap protrusions 162. These mating features can rotationally fix the hot-stick adaptor 282 to the cap 122 to provide a secure grip during installation. In one embodiment, an external band 302 is placed in the channel 298 to engage the channel 298 and the notches 164 of the cap 122 through the openings 300 to resist axial movement and maintain a firm grip between the hot-stick adaptor 282 and the cap 122. In some embodiments, the band 302 is made from metal and is crimped to the channel 298. In other embodiments, the band 302 is formed from a resilient material, such as a polymer or rubber material.

Figure 28:
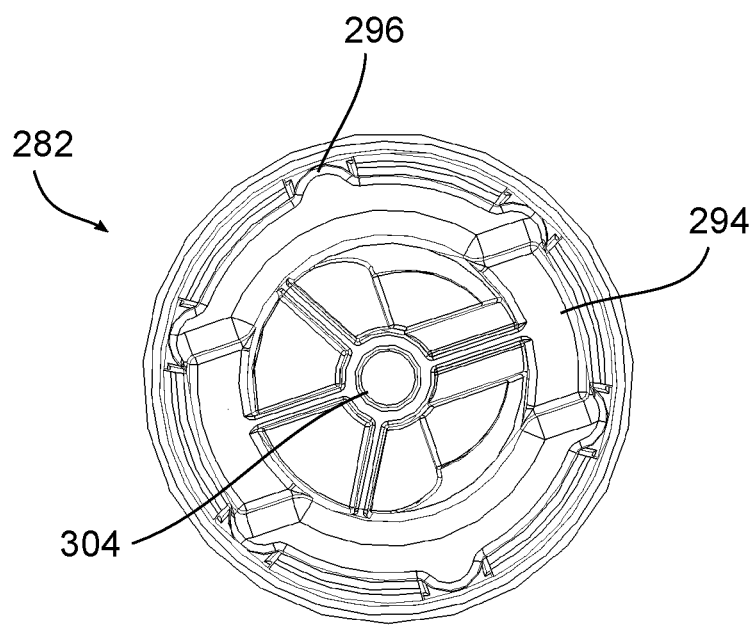
FIG. 28 is a rear view of FIG. 27.
Figure 29:
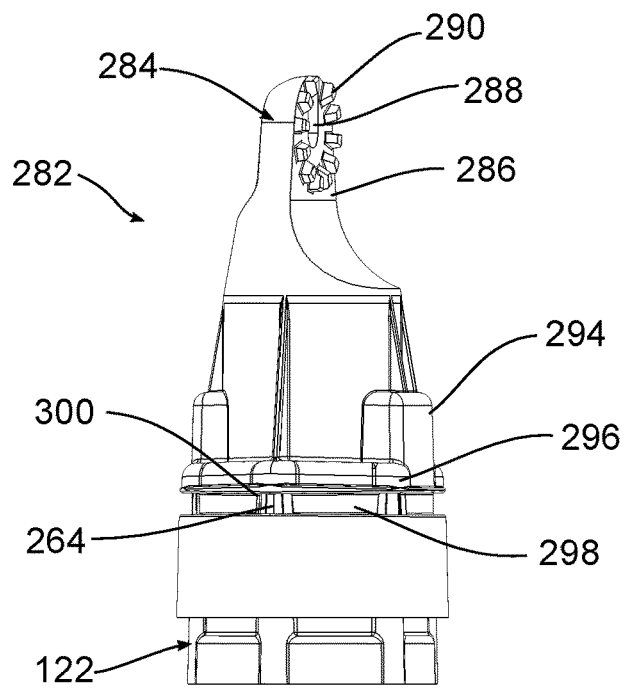
FIG. 29 is a side view of the hot-stick adaptor of FIG. 27 connected to the cap of FIG. 17.
Figure 30:
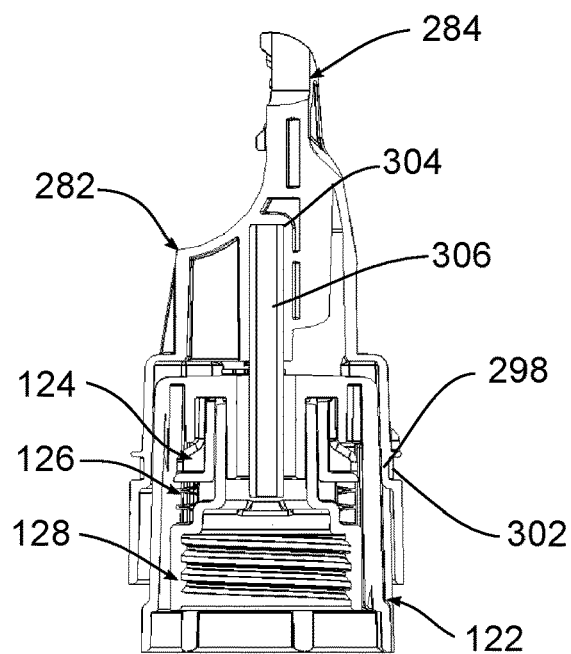
FIG. 30 is a sectional view of FIG. 29 with a band and a spring pin connected to the hot-stick adaptor.

As shown in FIGS. 28 and 30 the interior of the hot-stick adaptor 282 includes a central conduit 304. In one embodiment, when the cap 122 is connected to the assembly body 26, a spring pin 306 is inserted into the conduit 304 and extends into a shaft of the assembly body 36. The spring pin 306 flexes outwardly in a radial direction to provide friction between the hot-stick adaptor 282 and the assembly body 32.

Figure 31:
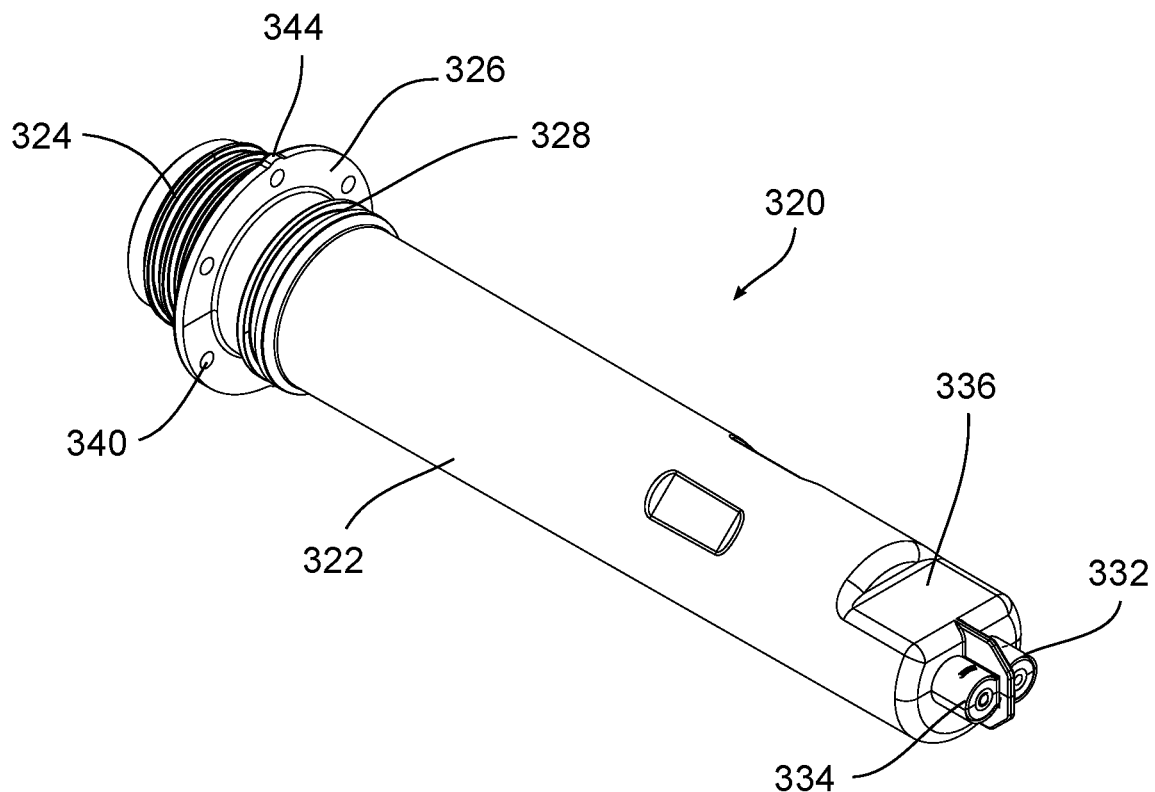
FIG. 31 is a perspective view of an exemplary battery tube.
Figure 32:
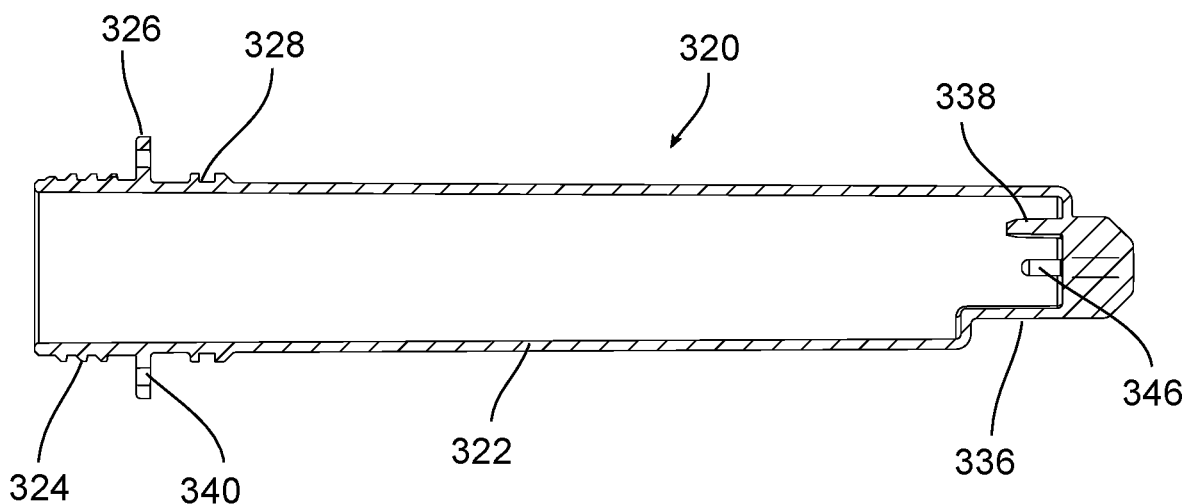
FIG. 32 is a side sectional view of FIG. 31 with the batter tube rotated 180 degrees.
Figure 33:
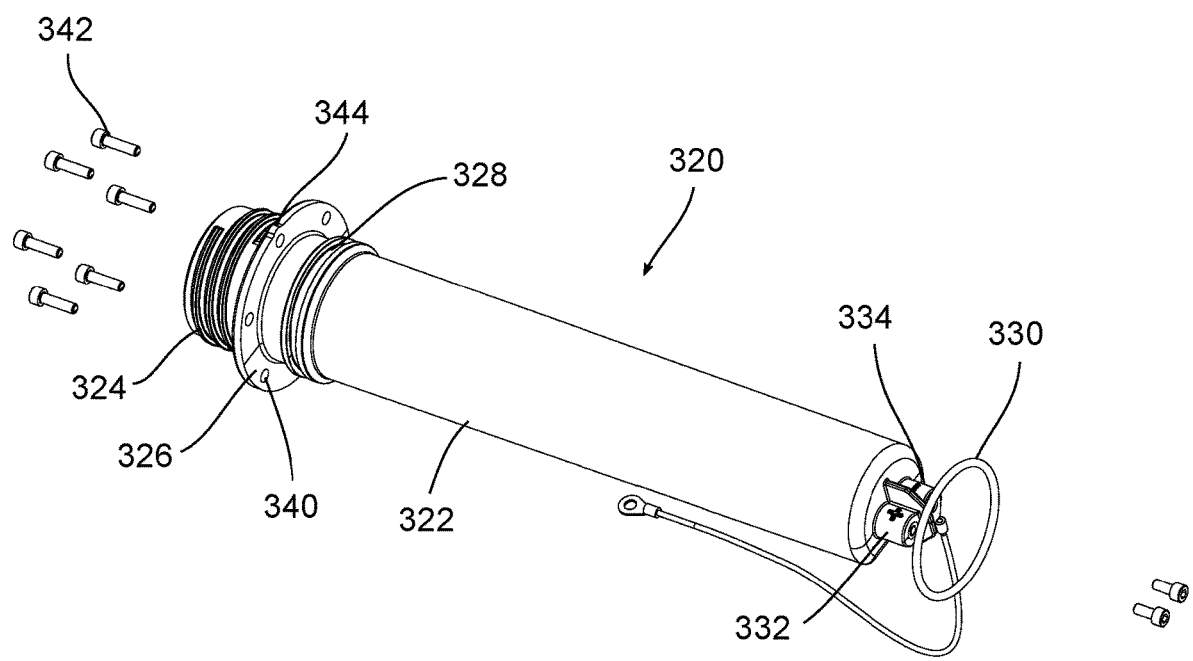
FIG. 33 is a perspective view of the battery tube and fasteners.

According to an exemplary embodiment, the battery assembly 20 is inserted into a battery tube that is connected to the recloser 10. FIGS. 31-33 show an exemplary embodiment of a battery tube 320. The battery tube 320 includes a substantially cylindrical body 322 having an external connector 324, a flange 326, a groove 328 for receiving a seal 330 (e.g., an O-ring), and a contact portion having a positive contact housing 332 and a negative contact housing 334. The external connector 324 mates with the first connector 28 of the battery assembly 20 and the assembly body 32 extending into the battery tube 320. The recloser 10 can further include a battery chamber that is configured to releasably receive the battery tube 320. Additionally, though a cylindrical tube is shown in FIG. 31, the battery tube 320 may be any type of receptacle capable of receiving the battery assembly 20 and allowing power to be supplied from the battery to the circuit interrupting device.

Shown in FIG. 32, the battery tube 320 body includes a keyed portion 336 that mates with the keyed portion 46 of the battery assembly 20. In some embodiments, a protrusion 338 extends from a rear wall into the interior of the body. The protrusion 338 can be configured to mate with an opening in the contact casing 42. The flange 326 has a series of openings 340 that align with corresponding openings in the recloser 10. Fasteners 342, such as screws, are used to connect the battery tube 320 to the recloser 10 through the flange 326 openings 340. In some embodiments, the flange 326 also has one or more protrusions 344 that act as an anti-loosening feature to prevent loosening of the cap 22 due to, e.g., line vibrations or thermal fluctuations. The protrusions 344 have a semi-circular configuration to mate with the openings defined by the rounded protrusions 162 on the cap 122 shown in FIG. 19.

Figure 34:
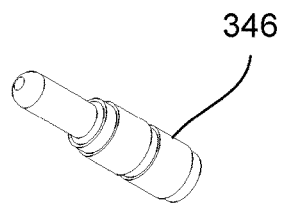
FIG. 34 is a perspective view of an exemplary contact pin.

Referring again to FIG. 33, the contact housings 332, 334, may include a pair of contact pins 346. An example of a contact pin 346 is shown in FIG. 34. A first pin 346 is positioned in the positive contact housing 332 and a second pin 346 is positioned in the negative contact housing 334. When the battery assembly 20 is inserted into the battery tube 320, the contacts pins 346 extend into respective positive and negative terminals 332, 334, in the contact casing 42. Cables can be connected to the contact housings 332, 334, (e.g., through fasteners) to form an electrical connection with the internal component of the recloser 10.

During installation the battery tube 320 is first connected to the recloser 10 and the battery assembly 20 is then inserted into the battery tube 320. The protrusions 344 extending from an outer edge of the flange 326 engage the recesses in the cap 122. This engagement helps to prevent the battery assembly 20 from loosening, such as due to line vibrations or thermal expansion.

In one embodiment, the battery tube 120 is used to install a battery assembly 20 when the recloser 10 is oriented as shown in FIG. 1. In other embodiments, the recloser 10 may be installed in a vertical orientation, where the battery opening is orthogonal to the ground as opposed to parallel to the ground.

FIGS. 35-41 show an exemplary embodiment of an adaptor plate 350 and an adaptor tube 352 used to install the battery assembly 20 in an alternate configuration, such as in a vertical orientation. The adaptor plate 350 is connected to the recloser 10 and to the adaptor tube 352. The adaptor tube 352 is further configured to receive the battery tube 320. The adaptor plate 350 and adaptor tube 352 allow the battery assembly 20 to be oriented substantially parallel to the ground when the battery opening in the recloser 10 is oriented orthogonal to the ground which, for example, may facilitate ground installation of the battery assembly 20 with a hot-stick. In some embodiments, the adaptor plate 350 and adaptor tube 352 is combined into a single unit.

Figure 36:
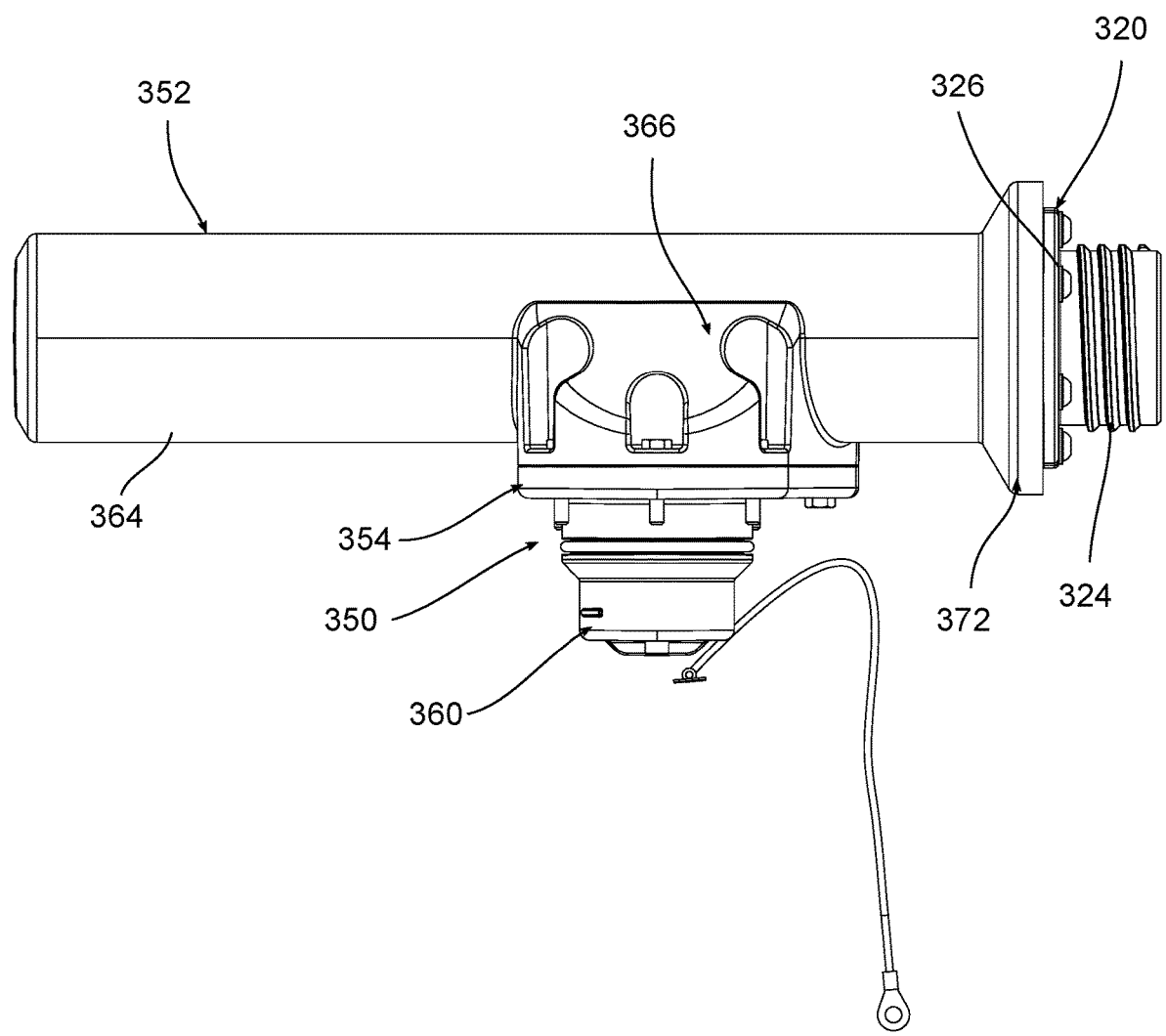
FIG. 36 is a top view of FIG. 35 with the components assembled.
Figure 37:
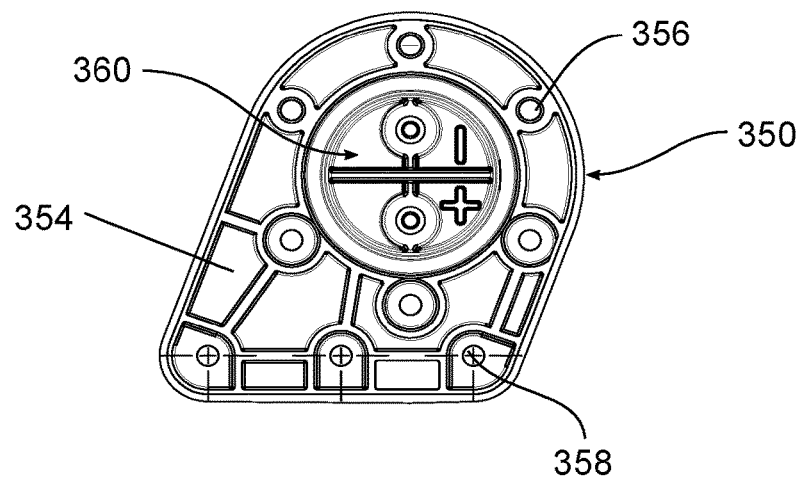
FIG. 37 is a side view of the adaptor plate of FIG. 35.

Shown in FIGS. 36-37, the adaptor plate 350 includes a mounting portion 354 having a first circular set of openings 356 around the circumference of the battery tube 320 and an outer set of plate openings 358. One or more of the first circular set of openings 356 and plate opening 358 are used to connect the adaptor plate 350 to the housing of the recloser 10. In an exemplary embodiment, a first portion of the first circular set of openings 356 are used to directly connect the adaptor plate to the recloser 10 and a second portion of the circular set of openings 356 connect to the adaptor tube 352 and the recloser 10. For example, the three circular openings 356 proximate to the outer opens 358 can receive a fastener that extends into the recloser and the remaining three circular openings 356 can receive fasteners that extend through the adaptor tube 352, the adaptor plate 350 and into the recloser 10. In some embodiments, the outer set of openings 358 are used to connect the adaptor tube 352 to the adaptor plate 350.

Figure 38:
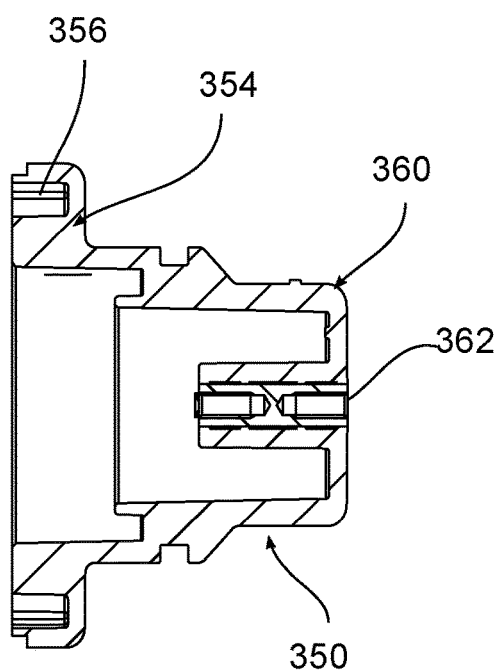
FIG. 38 is a top sectional view of FIG. 37.
Figure 39:
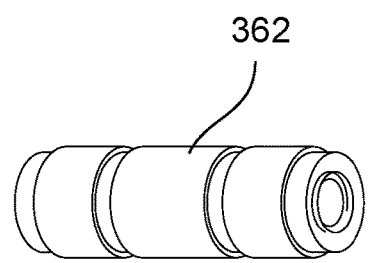
FIG. 39 is a perspective view of an exemplary contact.
Figure 40:
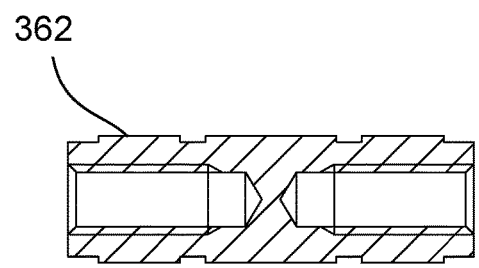
FIG. 40 is a sectional view of FIG. 39.

The adaptor plate 350 also includes a vertical contact portion 360 having a positive terminal 362 and a negative terminal 364 in one embodiment. FIG. 38 shows a cross section of the vertical contact portion 360. The positive and negative terminals of the vertical contact portion 360 may each retain a contact, such as the pass through contact .62 shown in FIGS. 39 and 40.

Figure 35:
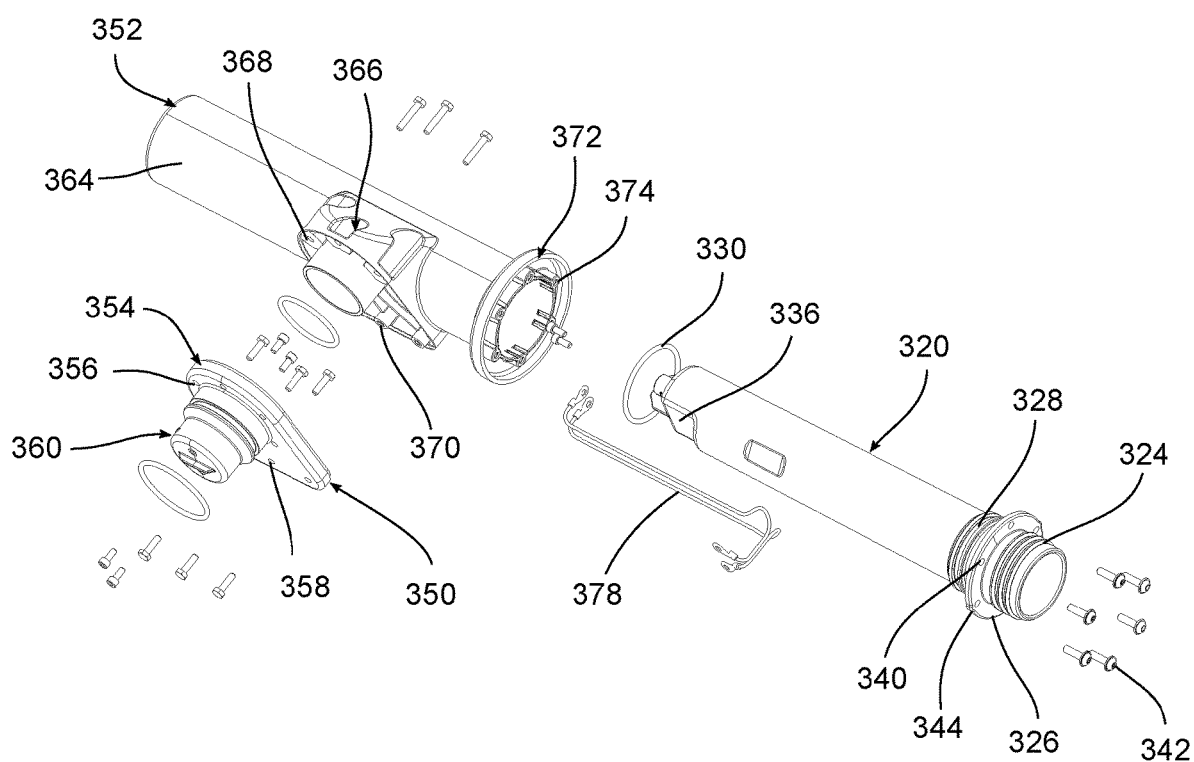
FIG. 35 is an exploded view of an exemplary vertical adaptor assembly.
Figure 41:
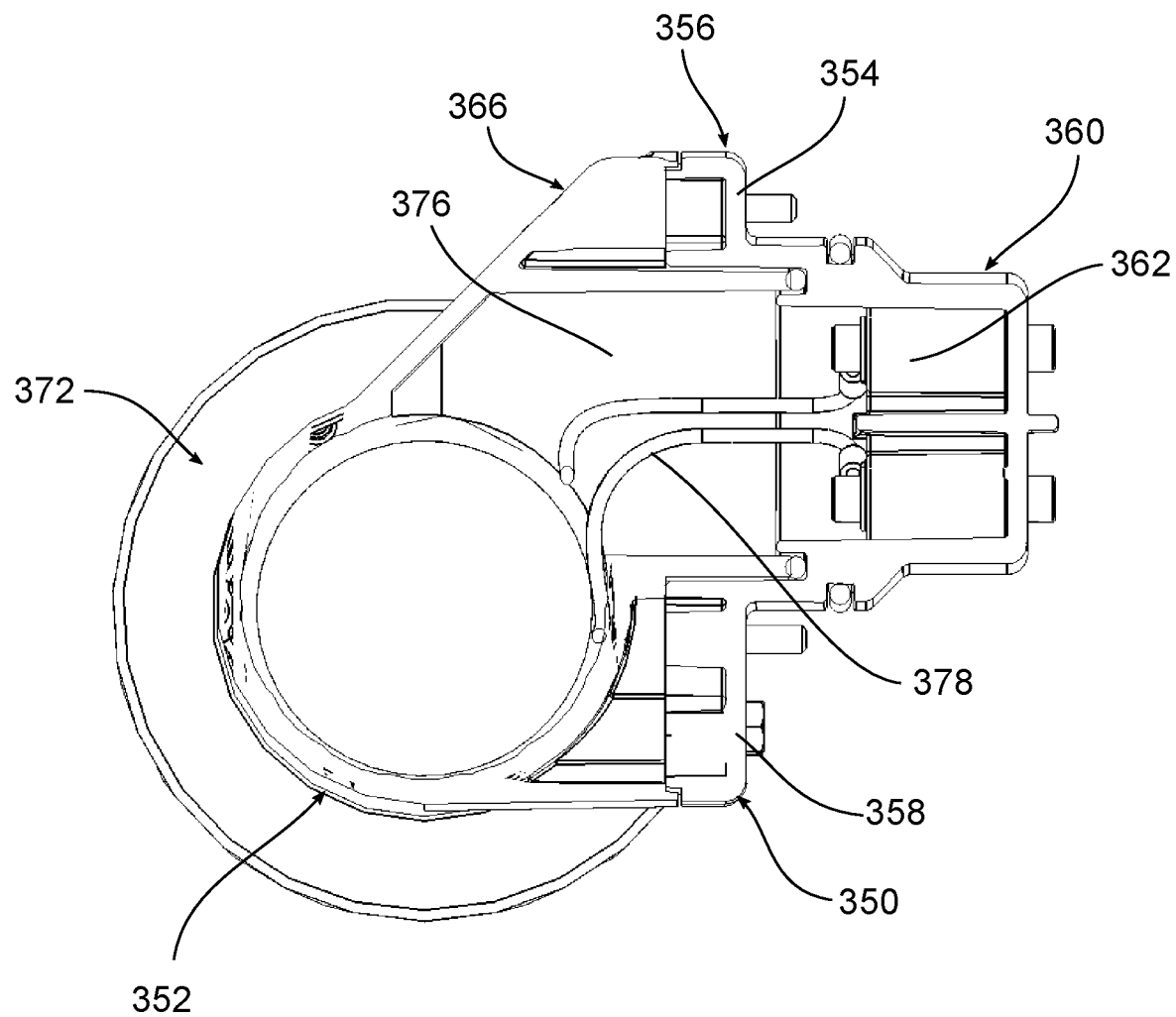
FIG. 41 is a rear, sectional view of the assembly of FIG. 35.

FIGS. 35, 36, and 41 show an exemplary embodiment of the adaptor tube 352 having a substantially cylindrical body 364 and a first mounting portion 366 for connecting the adaptor tube 352 to the adaptor plate 350. The first mounting portion 366 includes a second circular set openings 368 positioned around the circumference of the battery tube 320 that align with the first circular set of openings 356 on the adaptor plate and a set of outer openings 370 that align with the outer set of plate openings 358 on the adaptor plate. The adaptor tube 352 also includes a second mounting portion 372 for connecting the battery tube 320 to the adaptor tube 352. For example, the second mounting portion 372 includes a set of openings 374 that are the same configuration as the recloser openings so that the battery tube 320 can be connected to the adaptor tube 352 through the flange 326 as described with reference to FIGS. 33-34. The adaptor tube 352 includes a passage 376 through the first mounting portion to enable the battery assembly 20 to be electrically connected to the recloser 10.

During installation, the adaptor plate 350 is connected to the recloser 10 and conductors 378 are respectively connected to the positive and negative contacts in the adaptor plate 350 as shown in FIG. 41. In some embodiments, the conductor plate 350 includes a channel for receiving a gasket to form a seal between the conductor plate 350 and the recloser 10. Then, the conductors 378 can be coupled to the adaptor tube 352 and the adaptor tube 352 may be connected to the adaptor plate 350. The conductors 370 are then connected to the contact portion of the battery tube 320, and the battery tube 320 is connected to the adaptor tube 352. The battery assembly 20 is then connected to the battery tube 320 as described in various embodiments above. The recloser 10 may then be installed in a utility network, for example, mounted to a pole in an overhead power distribution system.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present disclosure, and are not intended to limit the structure of the exemplary embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed:

1. A removable battery for use with a circuit interrupting device in a power distribution system, comprising:
    a battery tube configured to be coupled to a housing of a circuit interrupting device, the battery tube having a first mating feature, a first positive contact, and a first negative contact; and
    a battery assembly configured to be inserted into the battery tube, the battery assembly including a second mating feature configured to mate with the first mating feature, a second positive contact, and a second negative contact,
    wherein the first and second mating features ensure a proper alignment of the battery assembly in the battery tube, and
    wherein the proper alignment facilitates the electrical connection between the first and second positive contacts and the first and second negative contacts.

2. The removable battery of claim 1, wherein the first mating feature includes a first keyed portion and the second mating feature includes a second keyed portion.

3. The removable battery of claim 2, wherein the battery tube includes a third mating feature, and wherein the battery assembly includes a fourth mating feature.

4. The removable battery of claim 3, wherein the third mating feature includes a projection and the fourth mating feature includes an opening configured to receive the projection.

5. The removable battery of claim 1, wherein the battery assembly includes a battery assembly body, a cap connected to a first end of the battery assembly body, and a contact casing connected to a second end of the battery assembly body.

6. The removable battery of claim 1, wherein the battery assembly includes a body having a substantially cylindrical configuration and the second mating feature includes a flattened section at an end of the body.

7. The removable battery of claim 1, wherein the battery tube includes a projection extending from a rear wall into the tube and the battery assembly includes an opening configured to receive the projection.

8. A removable battery for use with a circuit interrupting device in a power distribution system, comprising:
    a battery tube configured to be positioned in a housing of a circuit interrupting device; and
    a battery assembly configured to be inserted into the battery tube, the battery assembly comprising,
        a assembly body having a first end and a second end,
        a battery positioned in the assembly body,
        a cap assembly connected to the assembly body and configured to connect the battery assembly to the battery tube,
        wherein the cap assembly includes a torque-limiting device that prevents overtightening of the cap to the battery tube.

9. The removable battery of claim 8, wherein the cap assembly includes a cap having a first set of teeth and a ratchet member having a second set of teeth configured to mate with the first set of teeth.

10. The removable battery of claim 9, wherein the cap assembly includes a biasing member that biases the ratchet member toward the cap.

11. The removable battery of claim 9, wherein the cap assembly includes a threaded member connected to the ratchet member.

12. The removable battery of claim 8, wherein the cap assembly includes an internal thread and the assembly body includes an external thread.

13. The removable battery of claim 8, wherein a portion of the assembly body extends through the cap assembly.

14. The removable battery of claim 8, wherein the assembly body is rotatable with respect to the cap assembly.

15. A removable battery and hot stick adapter for use with a circuit interrupting device in a power distribution system, comprising:
    a housing including a circuit interrupting device and a battery chamber;
    a battery tube configured to be releasably connected to a battery chamber in a housing containing a circuit interrupting device, the battery tube having a first thread;
    a battery assembly configured to be inserted into the battery tube, the battery assembly including a cap having second thread configured to mate with the first thread to form a threaded connection; and
    a hot-stick adaptor having an interior receiving at least a portion of the cap and a connecting portion configured to connect to a hot-stick.

16. The removable battery and hot stick adapter of claim 15, wherein the connecting portion includes a first set of teeth.

17. The removable battery and hot stick adapter of claim 15, wherein the cap includes a protrusion having a notch and hot-stick adaptor includes a channel having an opening aligned with the notch.

18. The removable battery and hot stick adapter of claim 17, further comprising a band engaging the channel and the notch.

19. The removable battery and hot stick adapter of claim 15, wherein the cap includes a first shoulder and the hot-stick adaptor includes a second shoulder receiving the first shoulder.

20. The removable battery and hot stick adapter of claim 15, wherein the hot stick adaptor includes a central conduit extending into the interior, and further comprising a spring pin positioned in the conduit and engaging the battery assembly.

* * * * *